United States Patent
Nakazawa

(10) Patent No.: US 9,326,147 B2
(45) Date of Patent: Apr. 26, 2016

(54) INFORMATION PROCESSING DEVICE, INFORMATION PROCESSING METHOD, AND INFORMATION PROCESSING PROGRAM

(71) Applicant: Yuko Nakazawa, Kawasaki (JP)

(72) Inventor: Yuko Nakazawa, Kawasaki (JP)

(73) Assignee: NEC CASIO Mobile Communications, Ltd., Kanagawa, Kawasaki-shi (JP)

( * ) Notice: Subject to any disclaimer, the term of this patent is extended or adjusted under 35 U.S.C. 154(b) by 0 days.

(21) Appl. No.: 14/382,643

(22) PCT Filed: Feb. 19, 2013

(86) PCT No.: PCT/JP2013/053985
§ 371 (c)(1),
(2) Date: Sep. 3, 2014

(87) PCT Pub. No.: WO2013/133007
PCT Pub. Date: Sep. 12, 2013

(65) Prior Publication Data
US 2015/0087266 A1    Mar. 26, 2015

(30) Foreign Application Priority Data
Mar. 6, 2012  (JP) ................................. 2012-049321

(51) Int. Cl.
*H04W 12/08* (2009.01)
*G06F 3/0483* (2013.01)
(Continued)

(52) U.S. Cl.
CPC ............ *H04W 12/08* (2013.01); *G06F 3/0483* (2013.01); *G06F 3/04883* (2013.01); *G06F 21/31* (2013.01); *G06F 21/36* (2013.01); *G06F 21/6218* (2013.01)

(58) Field of Classification Search
CPC ...................................................... H04W 12/08
USPC ........................................................ 455/411
See application file for complete search history.

(56) References Cited

U.S. PATENT DOCUMENTS

2011/0283241 A1* 11/2011 Miller et al. .................. 715/863
2012/0036556 A1   2/2012 Lebeau et al.
(Continued)

FOREIGN PATENT DOCUMENTS

JP      2010-541046      12/2010
WO   WO 2009/042392 A2   4/2009

OTHER PUBLICATIONS

Android no Lock Gamen kara Apuri o Kido!
(Continued)

*Primary Examiner* — Leon Flores
(74) *Attorney, Agent, or Firm* — Finnegan, Henderson, Farabow, Garrett & Dunner LLP

(57) ABSTRACT

An information processing device includes: a display unit that displays a display screen; an operation unit that accepts a specified operation made on the display screen of the display unit; and a control unit that causes the display unit to display an unlocking screen including an indicator corresponding to a predetermined information processing function, and controls the operation unit into a state of accepting a specified operation on the indicator, based on a request for releasing a locking function of prohibiting a predetermined specified operation from being made on the operation unit, in a state where the locking function is active. The control unit determines that an unlocking operation for releasing the locking function has been input, in a case of accepting a specified operation indicating release of the locking function on the unlocking screen via the operation unit. The control unit determines that an activation operation of the information processing function corresponding to the indicator has been input, in a case of accepting an instruction operation indicating an execution of the information processing on the indicator via the operation unit.

20 Claims, 12 Drawing Sheets

(51) Int. Cl.
  *G06F 3/0488*  (2013.01)
  *G06F 21/31*  (2013.01)
  *G06F 21/36*  (2013.01)
  *G06F 21/62*  (2013.01)

(56) References Cited

U.S. PATENT DOCUMENTS

2012/0053887 A1* 3/2012 Nurmi ............................ 702/150
2012/0129496 A1* 5/2012 Park et al. ...................... 455/411
2012/0184247 A1* 7/2012 Choe et al. ..................... 455/411
2013/0298024 A1* 11/2013 Rhee et al. ..................... 715/716

OTHER PUBLICATIONS

Customize Dekiru Ripple Lock no Tsukaikata Shosai, [online], Internet URL:http://android-ap.net/mobile/2011/10/androidripple-lock.html, Oct. 2011.

Apuri o Kido suru Mae ni Lock Kaijo Pattern o Settei Dekiru 'App Protector', [online], Internet, URL:http://juggly.cn/archives/3419.html, Apr. 2010.

Mac Finder ni Hyojichu no Folder no 'Access-ken' o Hitome de Hanbetsu suru Hoho, [online], Internet, URL:http://inforati.jp/apple/mac-tips-techniques/system-hints/how-to-know-file-permission-in-mac-finder-easily.html, Apr. 2010.

International Search Report and Written Opinion mailed May 14, 2013 in corresponding PCT International Application.

Sameed, "Live Locker—Sleek, Shortcut-Filed Lock Screen Replacement [Android]", XP055211440, Retrieved from the Internet: URL:https://web.archive.org/web/20120301122152/http://www.addictivetips.com/mobile/live-locker-sleek-shortcut-filled-lock-screen-replacement-android [retrieved on Sep. 4, 2015], Mar. 2012.

A. Lein, "Windows Mobile 6.5 Professional—Review", XP055211443, Retrieved from the Internet: URL:http://web.archive.org/web/20120126103731/http://pocketnow.com/review/windows-mobile-65-professional-1 [retrieved on Sep. 4, 2015], Jan. 2012.

Extended European Search Report mailed Sep. 14, 2015 by the European Patent Office in counterpart European Patent Application No. 13756991.9.

* cited by examiner

INFORMATION PROCESSING DEVICE, INFORMATION PROCESSING METHOD, AND INFORMATION PROCESSING PROGRAM

CROSS-REFERENCE TO RELATED PATENT APPLICATIONS

This application is a National Stage Entry of International Application No. PCT/JP2013/053985, filed Feb. 19, 2013, which claims priority from Japanese Patent Application No. 2012-049321, filed Mar. 6, 2012. The entire contents of the above-referenced applications are expressly incorporated herein by reference.

TECHNICAL FIELD

The present invention relates to an information processing device, an information processing method, and an information processing program.

BACKGROUND ART

In recent years, mobile terminals such as smartphones and tablet type terminals are becoming popular. Many of these mobile terminals include a touch panel. There are terminals that include a locking function that restricts operation input in order to prevent false operation associated with erroneous operations.

For example, there is a terminal that displays on its touch panel, an unlocking screen where an unlocking icon is displayed in a state where the locking function is exerted (hereunder, referred to as locked state). The terminal releases the locked state as the user performs an operation of moving the unlocking icon to a specific position (for example, refer to Patent Document 1).

Moreover, as with the terminal of this Patent Document 1, there is, for example, a terminal that displays the current time and/or a standby screen. This allows the user to recognize the current time without executing the unlocking operation.

PRIOR ART DOCUMENT

Patent Document

[Patent Document 1] Japanese Unexamined Patent Application, First Publication No. 2010-541046

SUMMARY OF THE INVENTION

Problem to be Solved by the Invention

However, for example, in a case where an email is received in the locked state, after having performed an operation to release the locked state, it is necessary to perform an operation to view the received email and activate an application to display the received email. Therefore, user operability is poor and it is inconvenient.

An exemplary object of the present invention is to provide an information processing device, an information processing method, and a program capable of solving the above problem.

Means for Solving the Problem

An information processing device according to one exemplary aspect of the present invention includes: a display unit that displays a display screen; an operation unit that accepts a specified operation made on the display screen of the display unit; and a control unit that causes the display unit to display an unlocking screen including an indicator corresponding to a predetermined information processing function, and controls the operation unit into a state of accepting a specified operation on the indicator, based on a request for releasing request for releasing a locking function of prohibiting a predetermined specified operation from being made on the operation unit, in a state where the locking function is active. The control unit determines that an unlocking operation for releasing the locking function has been input, in a case of accepting a specified operation indicating release of the locking function on the unlocking screen via the operation unit. The control unit determines that an activation operation of the information processing function corresponding to the indicator has been input, in a case of accepting an instruction operation indicating an execution of the information processing on the indicator via the operation unit.

An information processing method according to one exemplary aspect of the present invention includes: causing a display unit to display an unlocking screen including an indicator corresponding to a predetermined information processing function, based on a request for releasing a locking function of prohibiting a predetermined specified operation from being made on an operation unit accepts a specified operation made on a display screen of the display unit, in a state where the locking function is active; determining that an unlocking operation for releasing the locking function has been input, in a case of accepting a specified operation indicating release of the locking function on the unlocking screen via the operation unit; and determining that an activation operation of the information processing function corresponding to the indicator has been input, in a case of accepting an instruction operation indicating an execution of the information processing on the indicator via the operation unit.

An information processing program according to one exemplary aspect of the present invention causes a computer to function as: a display unit that displays a display screen; an operation unit that accepts a specified operation made on the display screen of the display unit; and a control unit that causes the display unit to display an unlocking screen including an indicator corresponding to a predetermined information processing function, and controls the operation unit into a state of accepting a specified operation on the indicator, based on a request for releasing a locking function of prohibiting a predetermined specified operation from being made on the operation unit, in a state where the locking function is active, the control unit determining that an unlocking operation for releasing the locking function has been input, in a case of accepting a specified operation indicating release of the locking function on the unlocking screen via the operation unit, the control unit determining that an activation operation of the information processing function corresponding to the indicator has been input, in a case of accepting an instruction operation indicating an execution of the information processing on the indicator via the operation means.

Effect of the Invention

According to the present invention, an activation of a predetermined information processing function can be instructed in the locked state.

EMBODIMENTS FOR CARRYING OUT THE INVENTION

[First Exemplary Embodiment]

Figure 1:
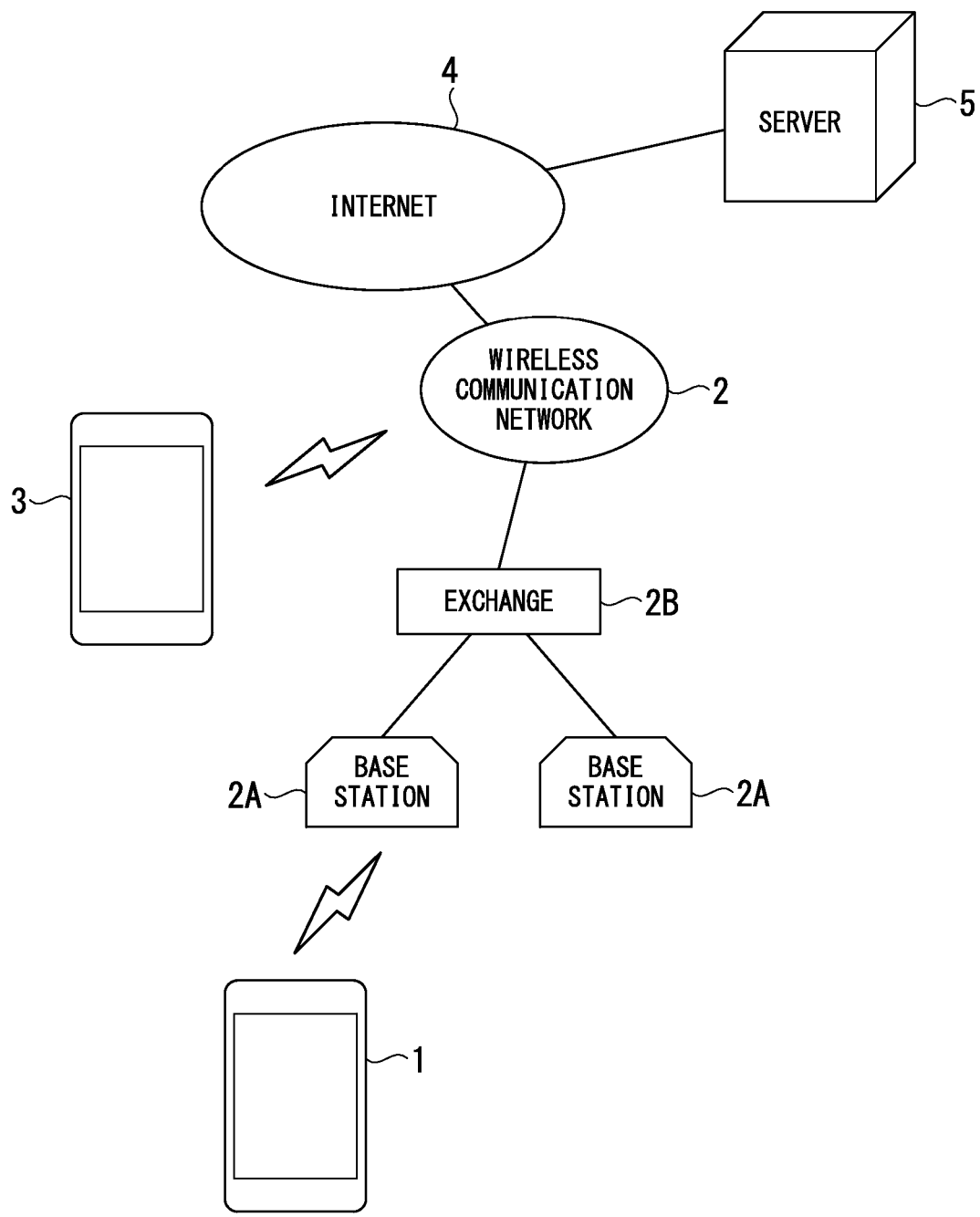
FIG. 1 is a diagram showing an example of a schematic configuration of an information processing system according to a first exemplary embodiment of the present invention.

Hereunder, a first exemplary embodiment of the present invention is described, with reference to the drawings. FIG. 1 is a diagram showing a brief overview of the information processing system according to the first exemplary embodiment of the present invention.

In the present exemplary embodiment, there is given an example of a case where the information processing device is a mobile terminal 1. FIG. 1 is a schematic diagram showing a communication network that this mobile terminal 1 can use. However, the present exemplary embodiment is not limited to this. The information processing device may be a smartphone, a portable game console, a PDA (personal digital assistant), a tablet type PC (personal computer), or a laptop type PC.

The mobile terminal 1 may include, for example, a voice communication function, an electronic mail function, an Internet access function (web access function), and a television function that enables reception and viewing of digital television broadcasting (such as one-segment terrestrial digital television broadcasting).

The mobile terminal 1 is connected to a wireless communication network (mobile communication network) 2 via the nearest base station 2A and exchange 2B. When connected to the wireless communication network 2, the mobile terminal 1 becomes able to perform voice communication with another mobile terminal 3 via this wireless communication network 2. The mobile terminal 1 is connected to the Internet 4 via the wireless communication network 2. When connected to the Internet 4, the mobile terminal 1 becomes able to access to websites and view the websites. Moreover, the mobile terminal 1 becomes able to perform streaming, in which it downloads and reproduces via the Internet 4 and the wireless communication network 2, multimedia contents such as motion images, still images, music, news, and music.

Figure 2:
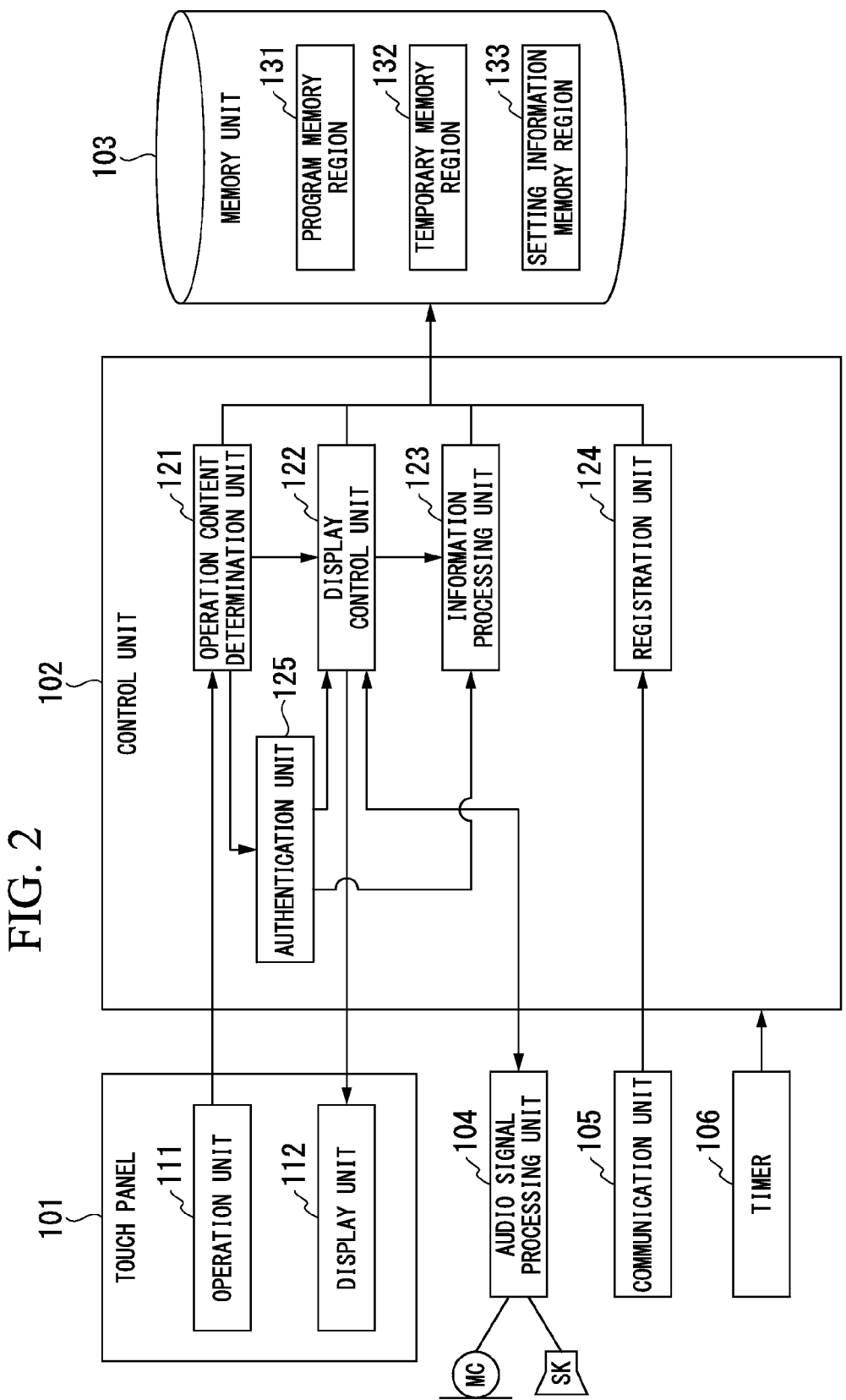
FIG. 2 is a block diagram showing an example of a configuration of an information processing device (mobile terminal) according to the first exemplary embodiment of the present invention.

FIG. 2 is a block diagram showing the basic constituents of the mobile terminal 1.

The mobile terminal 1 includes a touch panel 101, a control unit 102, a memory unit 103, an audio signal processing unit 104, a communication unit 105, and a timer 106.

The touch panel 101 includes an operation unit 111 and a display unit 112.

Hereunder, a state where a locking function is active so as to prohibit predetermined specified operations from being made on the operation unit 111 of the touch panel 101, is referred to as locked state.

In the locked state, this mobile terminal 1 accepts a request for releasing the locking function from an operation device (such as a power switch or another operation button) other than the touch panel 101. In this case, while the locking function is maintained active, the mobile terminal 1 can display the unlocking screen and can accept an unlocking operation and an operation of activating a predetermined information processing function.

That is to say, in the state where the locking function is active, the mobile terminal 1 can display the unlocking screen, and can exert an unlocking acceptance function that accepts the unlocking operation and the operation of activating the predetermined information processing function.

To describe specifically, when a request for locking function release is accepted in the locked state, the mobile terminal 1 activates a detection means of the touch panel 101 and displays the unlocking screen on the touch panel 101. The mobile terminal 1 makes a distinction between the unlocking operation made on the unlocking screen and the activation operation for the predetermined information processing function, and accepts both of the operations. For example, when an unlocking operation, which releases the locking function, is input on the unlocking screen, the mobile terminal 1 releases the locking function. As a result, the mobile terminal 1 is brought to the unlocked state. On the other hand, when an activation operation of the predetermined information processing function is input on the unlocking screen, the mobile terminal 1 executes the specified information processing function.

As described above, the locked state refers to a state of prohibiting the specified operations from being accepted on the operation unit 111 of the touch panel 101. In the locked state in the present exemplary embodiment, the prohibited instruction operations change before and after accepting a request for releasing the locking function from the operation device (such as a power switch or another operation button) other than the touch panel 101.

To describe specifically, in the locked state before releasing of the locking function is requested, the touch panel 101 displays no image, and a detection means of the touch panel 101 is all in the inactive state where operations to be made on the entire region of the display screen are restricted. That is to say, in the locked state before releasing of the locking function is requested, the display unit (display means) 112 of the touch panel 101 and the operation unit (detection means) 111 are both in the OFF state. In the locked state before releasing of the locking function is requested, all instruction operations are prohibited from being performed on the touch panel 101.

In the locked state after releasing of the locking function has been requested, the touch panel 101 displays the unlocking screen, and an unlocking operation and an activation operation of the predetermined information processing function to be input on this unlocking screen via the touch panel 101 are accepted. That is to say, among the operations that can be input to the touch panel 101, input of operations other than the unlocking operation and the predetermined information processing function are restricted.

In the present exemplary embodiment, in the case of the locked state after releasing of the locking function has been requested, the mobile terminal 1 is in a state where a detection means, which detects whether or not a finger is in contact in the entire region of the unlocking screen displayed on the touch panel 101, is activated. The configuration of the mobile terminal 1 is not limited to this. In the locked state after releasing of the locking function has been requested, an operation to be input to an operation screen, which is a predetermined part region of the entire screen of the touch panel 101, may be accepted, and an operation input to be made to the region of the entire screen of the touch panel 101 other than the operation screen may be restricted.

The unlocked state is a state where the locking function is inactive, and it refers to a state where operation input restrictions, which are in place in the locked state with the locking function being active, are released. In the present exemplary embodiment, in the case of the unlocked state, the mobile terminal 1 accepts all instruction operations input on the entire screen of the touch panel 101.

The operation unit 111 includes a sensor that accepts operations performed by the user. The operation unit 111 outputs to the control unit 102 the result of detection performed by the sensor. In the present exemplary embodiment, the operation unit 111, at constant temporal intervals, detects, by means of the sensor, the contact position of an operation means (operation body such as a finger) that comes in contact with the operation screen, and outputs detection results of this sensor. The operation unit 111 of the present exemplary embodiment is not limited to this configuration. For example, the operation unit 111 may detect the position of an operation instruction means such as a user's finger or an operation pen in the close vicinity of the operation screen by means of a non-contact sensor.

The display unit 112 displays display contents according to the control of the control unit 102. In the present exemplary embodiment, the display unit 112 is provided as the touch panel 101 integrally with the operation unit 111. The display unit 112 displays the operation screen, which is displayed when the operation unit 111 is accepting an operation.

The control unit 102 reads various types of information stored in the memory unit 103, and performs overall control of the mobile terminal 1. This control unit 102 includes an operation content determination unit 121, a display control unit 122, an information processing unit 123, a registration unit 124, and an authentication unit 125.

The operation content determination unit 121 determines the content of an operation accepted by the operation unit 111, based on the output of the operation unit 111. For example, the operation content determination unit 121 determines a movement of a user's finger from a contact position and a contact time of the user's finger indicated by the detection result of the operation unit 111. The operation content determination unit 121 determines the operation content indicated by the determined movement of the user's finger, based on the determined movement of the user's finger and the positional relationship with an image displayed on the display unit 112 when the operation is accepted.

For example, in the case where the operation unit 111 detects a movement (operation) of the user's finger coming in contact with the display screen, the operation content determination unit 121 determines the movement as a touch operation. In the case where the operation unit 111 detects a movement of the user's finger moving (operation) in a state where a contact position is being instructed by means of a touch operation, the operation content determination unit 121 determines the movement as a slide operation.

In the case where the operation unit 111 detects a movement of the user's finger being flicked away after the finger came in contact with the display screen (operation), the operation content determination unit 121 determines the movement as a flick operation.

The operation content determination unit 121 instructs the display control unit 122 to display a display content according to the operation content, based on the determination result. For example, in the case where the power button (not shown in the figure) is pressed down while the power is in the OFF state, the operation content determination unit 121 determines the power as having been turned ON. In this case, the operation content determination unit 121 outputs to the display control unit 122 a control signal that indicates to display an unlocking image. This display control unit 122 displays the unlocking screen on the display unit 112 based on a control signal from the operation content determination unit 121.

Furthermore, the operation content determination unit 121 stores in the memory unit 103 a flag which indicates that the locking function is active, in the following first case and second case. The first case is a case where the operation content determination unit 121 has accepted a request for releasing the locking function from an operation means (such as a power switch or another operation button) other than the touch panel 101. The second case is a case where the operation content determination unit 121 instructs the display control unit 122 to display the unlocking screen on the display unit 112. The configuration of the present exemplary embodiment is not limited to this. The flag that indicates the locking function as being active may be written into the memory unit 103 when the power has been turned OFF or has shifted to the sleep state previously. The sleep state is a state where the locking function is activated so as to prohibit predetermined specified operations from being made on the operation unit 111 of the touch panel 101, while the power is maintained ON.

When a request for releasing the locking function is accepted from an operation means other than the touch panel 101, the operation content determination unit 121 prohibits the predetermined specified operations from being accepted on the operation unit 111 of the touch panel 101. The operation means other than the touch panel 101 is, for example, a power switch or another operation button. The specified operations are, for example, operations other than the unlocking operation and the operation for activating a predetermined information processing function. In other words, when a request for releasing the locking function is accepted, the operation content determination unit 121 restricts operation input from being made on a predetermined region. The predetermined region refers to a region that is set for accepting a specified operation to be made on a displayed object (indicator) displayed on the unlocking screen. That is to say, in the state where the unlocking screen is displayed, the user can only perform a predetermined defined operation instruction to the predetermined region. As a result, the user often recognizes operations as being restricted from being made to outside the predetermined region. Accordingly, it is expressed as "restricting operations that correspond to the region" in the descriptions of the exemplary embodiments below. If partial touch detection on the screen is realized inexpensively in the future, then with use of a device that is capable of activating a part of the detection means to perform touch detection, a content similar to that shown in the present exemplary embodiment may be displayed on the unlocking screen and the operations disclosed in the exemplary embodiments may be accepted, while displaying the unlocking screen.

The operation content determination unit 121, for example, in the locked state after releasing of the locking function has been requested, accepts an operation from the operation region, within which acceptance of operation input has been preliminarily decided. However, it rejects to accept operations from the region where operation input is restricted. In other words, the operation content determination unit 121 does not determine operation contents based on detection signal input made within the region on the unlocking screen where operation input is restricted. Moreover, the operation content determination unit 121 does not output to the display control unit 122 or the information processing unit 123 control signals based on detection signal input made within the region where operation input is restricted.

The display control unit 122 controls display contents to be displayed on the display unit 112 based on operation contents indicated by determination results made by the operation content determination unit 121 and control signals from the operation content determination unit 121. In the present exemplary embodiment, the display control unit 122 executes an unlocking screen displaying process for displaying the unlocking screen on the display unit 112. Moreover, in the state where the information processing unit 123 is executing a specified information processing function (application), the display control unit 122 executes an application displaying process for displaying on the display unit 112 information processing results made by the information processing unit 123. Examples of the specified information processing function include an emailing application that executes information processing related to emails, and a previewing application that displays on the display unit 112 contents stored in the memory unit 103 such as still images and motion images. This emailing application is an electronic program that executes information processing for displaying received emails and sent emails, creating an email, and sending the created email.

The previewing application is an electronic program that executes information processing for displaying, on the display unit 112, contents stored in the memory unit 103.

This unlocking screen displaying process is a process for displaying the unlocking screen on the display unit 112. Details of the process contents are described later, with reference to FIG. 3.

The application displaying process is a process for displaying processing results of a general electronic program on the display unit 112, and the detailed description thereof is therefore omitted.

If the power-off operation is input with the switch button (not shown in the figure) being pressed down, the display control unit 122 turns OFF the power of the display unit 112, and the display unit 112 does not display the image. In the power saving mode standby state, if the power-off operation is input with the switch button being pressed down the display control unit 122 turns ON the power of the display unit 112 and displays the unlocking screen (unlocking screen displaying process). In the unlocking screen displaying process, the display control unit 122 displays on the unlocking screen an indicator for executing a predetermined information processing function (hereunder, referred to as application icon).

If the user instructs an execution of an application icon through the operation unit 111, the display control unit 122 displays on the display unit 112 the information processing result of the information processing corresponding to the specified application icon executed by the information processing unit 123 (application displaying process).

In the state of displaying the unlocking screen, if an operation for releasing the locking function is input on the operation unit 111 (unlocking operation), the display control unit 122 switches the display contents, for example, from the unlocking screen to the menu screen, or from the unlocking screen to the home screen.

The information processing unit 123 executes an application that corresponds to the specified application icon. That is to say, the information processing unit 123 executes information computation processing according to the electronic program of this application.

This information processing unit 123 outputs the processing result to the display control unit 122.

The registration unit 124 registers in the memory unit 103, data that has been received by the communication unit 105 from the server 5 through the Internet 4 for example. This registration unit 124, for example, downloads an electronic program from the server 5 by means of an application installed on the mobile terminal 1, and registers the electronic program in the memory unit 103.

Based on the content of the operation input from the operation content determination unit 121, the authentication unit 125 makes reference to authentication information stored in the memory unit 103 and determines whether or not to authenticate the input operation content (authentication process). This authentication information is a piece of information that verifies the user as being approved for making the information processing unit 123 execute the information processing according to the input operation content, and execute the function of outputting the information processing result. In the present exemplary embodiment, the authentication unit 125 performs a pattern authentication, a PIN authentication, a password authentication or the like. For example, if an activation operation for an application that corresponds to the specified application icon is input, this authentication unit 125 determines whether or not the user is approved for executing the information processing function that corresponds to the specified application icon.

The control unit 102 is not limited to the configuration described above. The control unit 102 may include a setting function that sets a security setting to indicate whether or not to have authentication performed by the authentication unit 125 in the case where an operation is input on the unlocking screen. For example, if the setting is changed by the user via the operation unit 111, this setting function of the control unit 102 writes into the memory unit 103 the setting content after the change has been made.

The memory unit 103 stores various types of information used for processing of the mobile terminal 1. This memory unit 103 includes, for example, a program memory region 131, a temporary memory region 132, and a setting information memory region 133. The memory unit 103 may be of a configuration including, for example, a removable portable memory (recording medium) such as an SD card, an IC card, and an external hard disk. The memory unit 103 may be provided in a predetermined external server (not shown in the figure).

The program memory region 131 is a memory region that stores programs and various applications for realizing processes related to the present exemplary embodiment according to the various operations performed by the mobile terminal 1. In the present exemplary embodiment, the program memory region 131 stores electronic programs of applications that correspond to application icons.

The temporary memory region 132 is a memory region that temporarily stores various types of information required for the mobile terminal 1 to operate. This temporary memory region 132 is a memory region that temporarily stores various types of information required for the mobile terminal 1 to operate such as flag information, timer information, and image information to be displayed on the display unit.

The flag information refers to information that indicates the current setting, and includes flag information that indicates, for example, whether or not the locking function is in the active state. In the present exemplary embodiment, when the power is turned ON, the operation content determination unit 121 writes into the temporary memory region 132, flag information that indicates that the locking function is active.

The setting information memory region 133 is a memory region that stores information that shows a preliminarily set setting. As flag information, this setting information memory region 133 stores, for example, flag information indicating that the security setting is ON in the locked state, and flag information indicating that the locking function is released upon activating an application. This flag information is written in the setting information memory region 133 by the registration unit 124 when the security setting or the unlocking setting is changed.

The audio signal processing unit 104 includes a microphone MC and a speaker SK. Upon accepting an analog audio signal input from the microphone MC, the audio signal processing unit 104 A/D converts the audio signal, and outputs digital audio data to the display control unit 122. If digital audio data input is accepted from the display control unit 122, the audio signal processing unit 104 A/D converts the audio data and outputs an analog audio signal from the speaker SK.

The communication unit 105 transmits and receives data to and from the nearest base station 2A via an antenna when the voice communication function, the electronic mail function, or the Internet access function is being operated.

The timer 106 determines the current date and time, and outputs date/time information indicating the determined date and time to the control unit 102.

Next, there is described an example of the display screen of the mobile terminal 1 and operation content input thereto, with reference to FIG. 3 through FIG. 7.

(An Example of the Unlocking Screen Displayed in the Locked State after Releasing of the Locking Function has been Requested)

Figure 3:
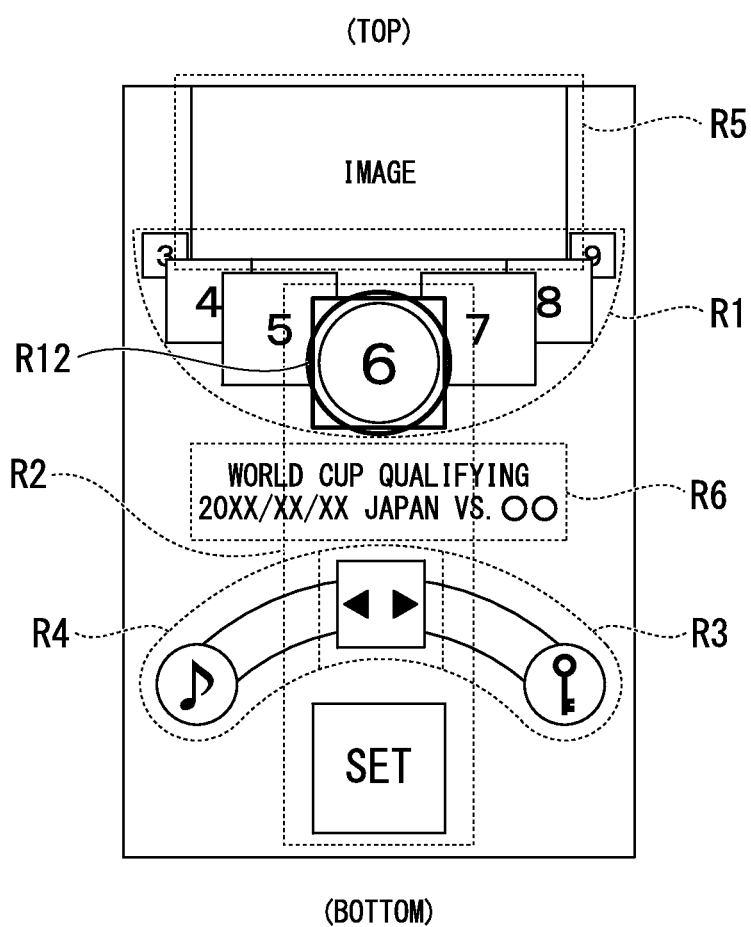
FIG. 3 is a diagram showing an example of an unlocking screen that is displayed on the information processing device (mobile terminal) according to the first exemplary embodiment of the present invention.

First, an example of the unlocking screen is described, with reference to FIG. 3. FIG. 3 is a diagram showing an example of the unlocking screen that is displayed immediately after the power is turned ON. In FIG. 3, the upper side of the figure is the upper side of the display unit (unlocking screen) 112, and the lower side of the figure is the lower side of the display unit 112. In the present exemplary embodiment, if the power button (not shown in the figure) is pressed down in the power-off state, the power of the mobile terminal 1 is turned ON, and the display control unit 122 executes the unlocking screen displaying process and displays on the display unit 112 the unlocking screen shown in FIG. 3.

As shown in FIG. 3, the unlocking screen includes an application icon display region R1, an activation operation screen region R2, an unlocking operation screen region R3, a silent mode setting operation screen region R4, a content image display region R5, and an application information display region R6. The application icon display region R1 displays application icons. The activation operation screen region R2 accepts an activation operation performed on an application icon. The unlocking operation screen region R3 accepts an unlocking operation performed on an unlocking icon. The silent mode setting operation screen region R4 accepts a silent mode setting operation performed on a silent mode icon. The content image display region R5 displays a content image. The application information display region R6 displays text data that corresponds to an application icon.

The application icon display region R1, the activation operation screen region R2, the unlocking operation screen region R3, and the silent mode setting operation screen region R4 are regions that accept operation input even in the locked state. Any other regions are regions where operation input is restricted in the locked state.

The application icon display region R1 is an image region that displays an indicator (application icon) for specifying an application preliminarily determined as an application that can be activated in the locked state. The display control unit 122 displays at least one application icon in this application icon display region R1. In the example shown in the figure, a plurality of application icons Q3 through Q9 (denoted with reference symbols "1" through "9" in FIG. 3) are displayed in the application icon display region R1.

For example, this application icon display region R1 is displayed on the upper half side of the display screen of the display unit 112. At the center position of this display control unit 122, there is included a region that overlaps with the activation operation screen region R2. The region where this application icon display region R1 and the activation operation screen region R2 overlap with each other is referred to as a reference start point region R12. In the present exemplary embodiment, the display control unit 122 determines an application icon positioned in the reference start point region R12 as a specified application icon at the current point in time.

In the present exemplary embodiment, in the case where a plurality of application icons are displayed in this application icon display region R1, the display control unit 122 executes a process that progressively changes the plurality of application icons to be displayed sequentially in the reference start point region R12. By means of this process, the application icons displayed in the application icon display region R1 rotate in a certain direction to be sequentially positioned in the reference start point region R12. If the operation unit 11 accepts an input of a flick operation or a slide operation made in the application icon display region R1 by the user, the operation content determination unit 121 determines that there has been accepted an operation that switches application icons displayed in the reference start point region R12. The display control unit 122 changes the application icons displayed in the reference start point region R12, based on the operation determination result made by the operation content determination unit 121. At this time, the display control unit 122 may display in the application icon display region R1 a motion image that illustrates the plurality of application icons displayed in the application display region R1 being rotated in the direction of a flick operation or a slide operation.

In this case, the order and position of the plurality of application icons displayed in the application icon display region R1 may be set by the user. The application icon display region R1 may preferentially display application icons of a higher use frequency, based on history information of the user. In the case of displaying updated pieces of information such as new arrival information, pieces of information with more recent update time and date may be displayed preferentially in a sequential manner.

In this manner, by making it possible to change the plurality of application icons displayed in the reference start point region R12 of the application icon display region R1, it becomes possible to specify a target of an activation operation input of an application that corresponds to the application icon. This activation operation is described in detail later.

The image of an application icon is created based on an image that plainly expresses the content of the corresponding application. Here is described an example of the image of an application icon that is associated with an application that displays content data stored in the memory unit 103. As this type of application icon, a thumbnail image of the content data may be used. Here is described an example of the image of an application icon that is associated with an application that displays newly arrived emails and newly arrived phone calls. As this type of application icon image, an image that indicates the sender of an email or an image that indicates the caller of a phone call may be used. In the case where the security setting in the locked state is set to ON, the display control unit 122 does not display, as an application icon image, the thumbnail image that corresponds to the specified application icon or the image that indicates the sender.

In this manner, if the security setting is set to OFF, an image that indicates the content of the application is used as the application icon image. As a result, the content of the application can be intuitively conveyed to the user.

Moreover, if the security setting is set to ON, the application icon image is displayed in the state of not including the content of the application. As a result, it is possible to prevent privacy related information from being displayed on the unlocking screen before security authentication is completed. In the present exemplary embodiment, even in the case where the security setting is set to ON, the mobile terminal 1 displays the unlocking screen before displaying the authentication screen when the power is turned ON. In this type of case, privacy related information is prevented from being displayed on the unlocking screen as the application icon displayed on the unlocking screen. With this configuration, it is possible to prevent leaks of personal information or confidential information, and prevent breach of privacy.

In the example shown in FIG. 3, an application icon Q6 is positioned in the reference start point region R12.

In this case, the operation content determination unit 121 determines that an application that corresponds to the application icon Q6 positioned in the reference start point region R12 is specified. This application icon Q6 is an icon that corresponds to an application that displays broadcast program content on the display unit 112. In the present exemplary embodiment, the application icon Q6 is associated with the program content of a broadcast program of a game "World Cup Qualifying, Japan vs. ○○, held on 20XX/XX/XX". The data of this broadcast program content may be data stored in the memory unit 103. The data of this broadcast program content may be data of the currently broadcasted program that has been download by means of digital broadcasting. The data of this broadcast program content may be data obtained by means of streaming of the broadcast program that has been saved on the server 5.

In the application icon display region R1, as an application icon, for example, there is displayed an indicator that instructs an execution of an application installed on the mobile terminal 1. Examples of this application include an electronic program that exerts a previewing function for displaying motion images and still images stored in the memory unit 103, an electronic program that exerts an emailing function for displaying received emails, and an electronic program that exerts a telephony function for displaying people and telephone numbers of received call origins.

The content image display region R5 is a region that is positioned on the upper side within the unlocking screen and on the upper side of the application icon display region R1. This content image display region R5 is a region that displays, for example, a content stored in the memory unit 103 or a motion image or still image corresponding to the content input from an external device. The image displayed in the content image display region R5 may change progressively. In the case of displaying a plurality of images, the images may be displayed in a predetermined order, and also the images may be displayed in a random order.

In the case where the security setting in the locked state is set to ON, the display control unit 122 does not display these motion images or still images in the content image display region R5 even when the motion images or still images of the contents are stored in the memory unit 103.

The display control unit 122 may display in the content image display region R5, a motion image or still image that relates to a specified application icon.

In the present exemplary embodiment, as described above, in the case where the application icon Q6 is specified, the content image display region R5 displays, for example, a video of a highlighted game scene or an image that shows positions of players.

The application information display region R6 is a region that is positioned substantially in the center of the unlocking screen.

This application information display region R6 is a region that displays related information (such as image, motion image, text) to show the content of an application corresponding to a specified application icon. In the present exemplary embodiment, the operation content determination unit 121 determines the application icon positioned in the reference start point region R12 as being specified. As described above, in the case where the application icon Q6 is specified, the application information display region R6 displays related information to show the content of the application corresponding to the specified application icon. Examples of the related information include content title and/or text data that indicate the details of the content. This application information display region R6 may display the name or content of the application corresponding to the specified application icon. If the specified application icon corresponds to the application that displays newly arrived emails and newly arrived phone calls, the application information display region R6 may display the name, telephone number, and email address of the person from whom a call has been received, or the content and subject of a received email.

In the case where the security setting in the locked state is set to ON, the display control unit 122 does not display, in the application information display region R6, information that has been preliminarily determined as personal information, confidential information, or other privacy related information among the related information that indicates the content of the application corresponding to the specified application icon.

In this manner, in the case where the security setting is set to OFF, the application information display region R6 displays related information showing the content of the application corresponding to the specified application icon. As a result, the content of the application can be intuitively conveyed to the user. Therefore, the user can easily be made aware of the content of the application that corresponds to the application icon.

Moreover, in the case where the security setting is set to ON, the display control unit 122 restricts display of information that has been preliminarily determined as personal information, confidential information, or other privacy related information, in the application information display region R6. In other words, the display control unit 122 displays, in the application information display region R6, only the limited related information other than information related to such personal information, confidential information, or other privacy related information. As a result, it is possible to prevent personal information, confidential information, or other privacy related information from being displayed on the unlocking screen before security authentication is completed. In the present exemplary embodiment, even in the case where the security setting is set to ON, the mobile terminal 1 displays the unlocking screen before displaying the authentication screen when the power is turned ON. In this type of case, personal information, confidential information, or other privacy related information are prevented from being displayed on the unlocking screen. As a result, it is possible to prevent leaks of personal information or confidential information, and prevent breach of privacy.

In this manner, a motion image, a still image, or text data that accept an activation operation are displayed on the unlocking screen. As a result, it is possible to make the user aware of an application that can be activated even in the locked state. Moreover, when an email arrives, the content of the received email, and/or the sender of the email are displayed on the unlocking screen. As a result, without activating the application, the user can obtain a certain amount of information only by checking the unlocking screen. Therefore, the user can activate an application as necessary, intuitively select an application that she/he wishes to activate, and input an activation operation.

Moreover, in the case where the security setting in the locked state is set to ON, the mobile terminal 1 of the present exemplary embodiment does not display, by personal choice, on the unlocking screen, personal information, confidential information, or other privacy related information including motion images and still images stored in the memory unit 103 and information that indicates the origins and contents of received calls. Thereby, even in a case where a third party other than the owner of the mobile terminal 1 turns the power ON and the unlocking screen is displayed, it is possible to prevent privacy related information from being seen by the third party.

Furthermore, as shown in FIG. 3, the activation operation screen region R2 is a region that differs at least partly from the unlocking operation screen region R3 within the unlocking screen. In the present exemplary embodiment, the activation operation screen region R2 and the unlocking operation screen region R3 are partly overlapping with each other. However, the regions other than the overlapped portion are different regions. In this manner, by providing the regions for inputting an activation operation and an unlocking operation as different regions, the operation content determination unit 121 can separately recognize an activation operation and an unlocking operation input on the unlocking screen. As a result, it is possible to prevent the operation content determination unit 121 from making a false determination between an activation operation and an unlocking operation, and prevent malfunction due to the user performing a false operation as a result of being confused by the activation operation and the unlocking operation.

(An Example of Application Activation Operation in the Locked State after Releasing of the Locking Function has been Requested)

Figure 4:
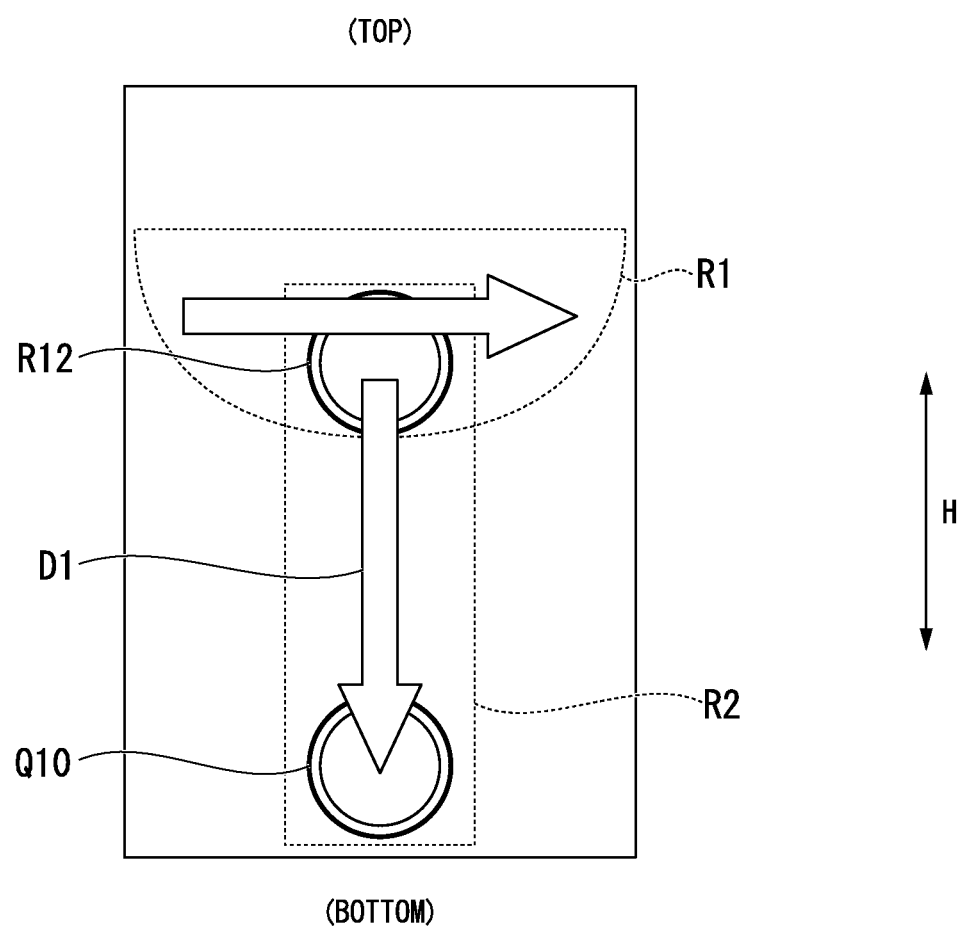
FIG. 4 is a diagram showing an example of an operation region within the unlocking screen that is displayed on the information processing device (mobile terminal) according to the first exemplary embodiment of the present invention.

Next is described an example of an application activation operation input on the unlocking screen shown in FIG. 3, with reference to FIG. 4.

As shown in FIG. 4, the activation operation screen region R2 is, for example, a region that is long in the first direction H, and overlaps, in the reference start point region R12, with the application icon display region R1.

In the present exemplary embodiment, as shown in the figure, the activation operation screen region R2 is a region that is positioned in the substantially center portion of the display screen of the display unit 112.

The first direction H refers to a directionality D1 of an activation operation. In the present exemplary embodiment, the first direction H refers to a direction toward the lower side from the upper side of the unlocking screen. That is to say, in the present exemplary embodiment, an activation operation refers to an operation such that after having specified an application icon positioned in the reference start point region R12 by means of a touch operation with an operation means (such as a finger), the operation means is moved in the first direction H with respect to the specified application icon, from the reference start point region R12 serving as the starting point. This operation of moving the operation means in the first direction H may be a flick operation, in which the operation means is flicked in the first direction H, or it may be a slide operation in which the specified application icon is moved to the activation operation conclusion icon Q10. This activation operation conclusion icon Q10 is displayed by means of an image displayed as "SET" as shown in FIG. 3.

This activation operation conclusion icon Q10 is displayed on the lower side end of the unlocking screen, which is positioned opposite to the reference start point region R12, in the long and thin activation operation screen region R2. The activation operation conclusion icon Q10 is an indicator for clearly conveying the operation content of the activation operation to the user at the time of making an activation operation input. In this case, the operation content determination unit 121 determines an activation operation input as having been made if the application icon positioned in the reference start point region R12 has been specified by means of a touch operation and the specified application icon has been slide-moved from the reference start point region R12 to the activation operation conclusion icon Q10. At this time, the display control unit 122 displays the specified application icon being superimposed on the unlocking screen so that it moves in synchronization with the movement of the finger. In the case where the operation content determination unit 121 determines an activation operation input as having being made, the display control unit 122 switches the unlocking screen displayed on the display unit 112, and displays on the display unit 112 an image corresponding to the specified application icon.

In this manner, the operation content determination unit 121 accepts the activation operation of the specified application icon on the unlocking screen. As a result, it is possible to reduce operation steps of the activation operation in the present exemplary embodiment, compared to an operation not following the present exemplary embodiment, in which the unlocking operation is input, then an application icon is specified, and the activation operation is input. Thereby, it is possible to improve the level of user operability.

Moreover, the operation content determination unit 121 determines an activation operation as having been accepted in the case where, on the unlocking screen, while an application icon positioned in the reference start point region R12 among application icons displayed in the application icon display region R1 is being specified, there is made an input of an operation in which the specified application icon is moved in the first direction H from the reference start point region R12. In this manner, as the activation operation, the directionality D1 of the operation (first direction H) and the starting point position of the operation (reference start point region R12) are preliminarily determined. That is to say, unless the operation is performed intentionally, making an input of the activation operation is difficult and malfunction due to unintended operations can be prevented.

Furthermore, the activation operation itself is a simple operation such as a flick operation, in which the icon is flicked in a certain direction, and a slide operation, in which the touched icon is moved in a certain direction. Therefore, the user can instruct an activation of an application corresponding to an application icon with an easy and intuitive operation.

In the locked state after releasing of the locking function has been requested, operation input is restricted in the region other than the application icon display region R1, the activation operation screen region R2, the unlocking operation screen region R3, and the silent mode setting operation screen region R4, so that malfunction will not occur due to an unintended operation (false operation) made by the user via the unlocking screen. Moreover, even in these regions that accept an operation, the operation content determination unit 121 determines operation content only of a predetermined intended operation and accepts an operation indicated in the determination result. Accordingly, the operation accepted on the unlocking screen needs to be an intended operation to prevent malfunction even if it is a simple operation. The mobile terminal 1 according to the present exemplary embodiment accepts, on the unlocking screen, an intended, also intuitive and simple operation, and thereby malfunction due to a false operation can be prevented while improving the level of operability.

Moreover, as described above, the operation content determination unit 121 accepts as an activation operation, a flick operation or a slide operation that is made from the reference start point region R12 serving as its starting point. That is to say, even in a case where an application icon displayed outside the reference start point region R12 is moved toward the activation operation conclusion icon Q10, the operation content determination unit 121 determines this operation as not being an activation operation. In other words, the operation content determination unit 121 determines an activation operation as having been accepted only in the case where the operation means (such as a finger) is moved on the path along the first direction H, which starts from the reference start point region R12. Therefore, as described above, the operation content determination unit 121 can accept an intended operation as an activation operation, and prevent malfunction due to an unintended false operation. Moreover, the operation region that accepts this activation operation may be limited (may be narrowed). As a result, the operation region that may possibly accept a false operation can be narrowed, and therefore, it contributes to further prevention of malfunction due to a false operation.

Furthermore, the operation content determination unit 121 according to the present exemplary embodiment may determine an unlocking instruction as having been accepted, in the case where an activation operation has been determined as having been accepted. In this case, the setting information memory region 133 of the memory unit 103 stores setting information (flag information) that indicates whether or not to determine, when an activation operation is determined as having been accepted, that an unlocking instruction has been accepted at the same time. The operation content determination unit 121 makes reference to this setting information, and determines the accepted operation as being an operation that indicates only an activation instruction for a specified application, or determines it as being an operation that indicates an activation instruction for the specified application as well as an instruction for releasing the locking function.

In this manner, the operation content determination unit 121 accepts an activation instruction for a specified application as well as an instruction for releasing the locking function in the case where releasing of the locking function at the time of receiving an activation instruction has been preliminarily set. As a result, the user can easily release the locking and activate the specified application function only by moving the application icon positioned in the reference start point region R12 toward the first direction H on the unlocking screen. Thereby, the level of operability can be improved since malfunction due to an unintended operation (false operation) can be prevented and operation steps can be reduced.

Furthermore, the operation content determination unit 121 according to the present exemplary embodiment determines an activation operation input for the specified application as having been made if the application icon positioned in the reference start point region R12 has been specified and an operation of moving the specified application icon from the reference start point region R12 to the activation operation conclusion icon Q10 has been accepted.

In this manner, by presenting to the user the terminal point of the movement of the specified application icon by means of the activation operation conclusion icon Q10, it is difficult for the operation content determination unit 121 to accept an activation operation unless the user performs an intended operation. In the present exemplary embodiment, by displaying the activation operation conclusion icon Q12, the user is notified that after an operation with the application icon displayed in the reference start point region R12 of the application icon display region R1 is performed, an operation is performed to move it to the activation operation conclusion icon Q10, which is present on the first direction H side of this reference start point region R12. Thereby, in the case where the user wishes to perform an activation operation, the fact that an input of the activation operation described above needs to be performed, can be visually conveyed, and an input of the operation for activating a function can be made easier for the user to perform. Moreover, by making the content of the activation operation an intended operation as described above, it is possible to prevent malfunction due to an unintended operation (false operation).

(An Example of the Unlocking Operation in the Locked State after Releasing of the Locking Function has been Requested)

Figure 5:
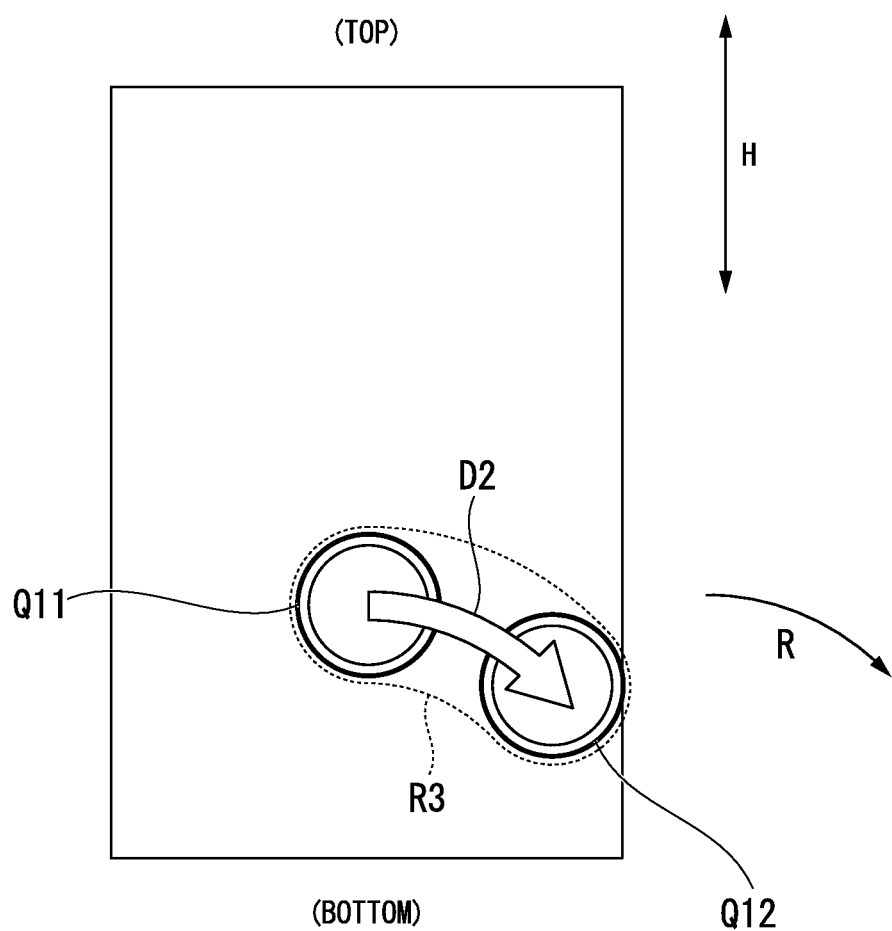
FIG. 5 is a diagram showing another example of the operation region within the unlocking screen that is displayed on the information processing device (mobile terminal) according to the first exemplary embodiment of the present invention.

Next is described an example of the unlocking operation input on the unlocking screen shown in FIG. 3, with reference to FIG. 5.

As shown in FIG. 5, for example, the unlocking operation screen region R3 is a region that extends in a direction (second direction R) that is different from the first direction H.

In the present exemplary embodiment, the unlocking operation screen region R3 is of a shape that corresponds to a predetermined locking operation path. The unlocking operation screen region R3 is a region that is of an arch-curved shape that extends in the second direction R in the example shown in FIG. 5. In this unlocking operation screen region R3, an operation icon Q11 is displayed at one end near the center portion of the unlocking screen, and an unlocking operation conclusion icon Q12 is displayed on the other end near the outer periphery portion of the unlocking screen.

That is to say, the unlocking operation refers to an operation of moving an operation means in the direction (second direction R), which is different from the directionality D1 (first direction H) of the activation operation, while the operation icon Q11 is maintained being specified by means of a touch operation with the operation means (such as a finger). That is to say, the first direction H and the second direction R are directions that intersect with each other. In the present exemplary embodiment, the activation operation screen region R2 and the unlocking operation screen region R3 are positioned so that the path of the activation operation and the path of the unlocking operation are in a positional relationship in which they intersect with each other on the unlocking screen. This operation of moving the operation means in the second direction R, which differs from the first direction H, may be a flick operation, in which the operation means is flicked in the direction that differs from the first direction H, or it may be a slide operation in which the specified application icon Q11 is moved to the unlocking operation conclusion icon Q12.

In this manner, the memory unit 103 of the mobile terminal 1 preliminarily registers that the directionality D1 of the activation operation (first direction H) and the directionality D2 of the unlocking operation (second direction R) are operations of separate directionalities respectively. Accordingly, the operation content determination unit 121 can separately recognize an activation operation and an unlocking operation input on the unlocking screen. Moreover, by providing the activation operation and the unlocking operation as operations with directionalities, the operation content determination unit 121 can more clearly determine whether it is an activation operation or an unlocking operation, by distinguishing them from a false operation mistakenly input on the unlocking screen. In other words, touch operations are highly likely to be operated falsely while the mobile terminal 1 is in a pocket, and also, the user is highly likely to perform a false input when the mobile terminal 1 is taken out or put into a pocket. In the present exemplary embodiment, as movements of the activation operation and the unlocking operation, movements that are highly unlikely to be operated falsely as mentioned above are registered, and thereby it is possible to prevent malfunction due to a false operation.

Furthermore, in the case of inputting an activation operation or an unlocking operation, the user only needs to perform, on an icon, each of these clearly distinguished operations with similar operation manners (moving operations each with a different direction), following the conclusion icon displayed on the unlocking screen or an image that indicates the operation direction. As a result, the user can easily perform an operation for activating a function and an unlocking operation without being confused.

Furthermore, the activation operation screen region R2 and the unlocking operation screen region R3 are positioned so that the path of the activation operation and the path of the unlocking operation are in a positional relationship in which they intersect with each other on the unlocking screen. As a result, both of these operations can be clearly distinguished, and the paths can be made long. Moreover, the user can easily recognize the destinations of the moving operations. That is to say, by setting the paths long, the user can determine that a region of the opposite side that is separated by the intersecting path is the destination of the moving operation.

(An Example of a Silent Mode Setting Operation in the Locked State after Releasing of the Locking Function has been Requested)

Figure 6:
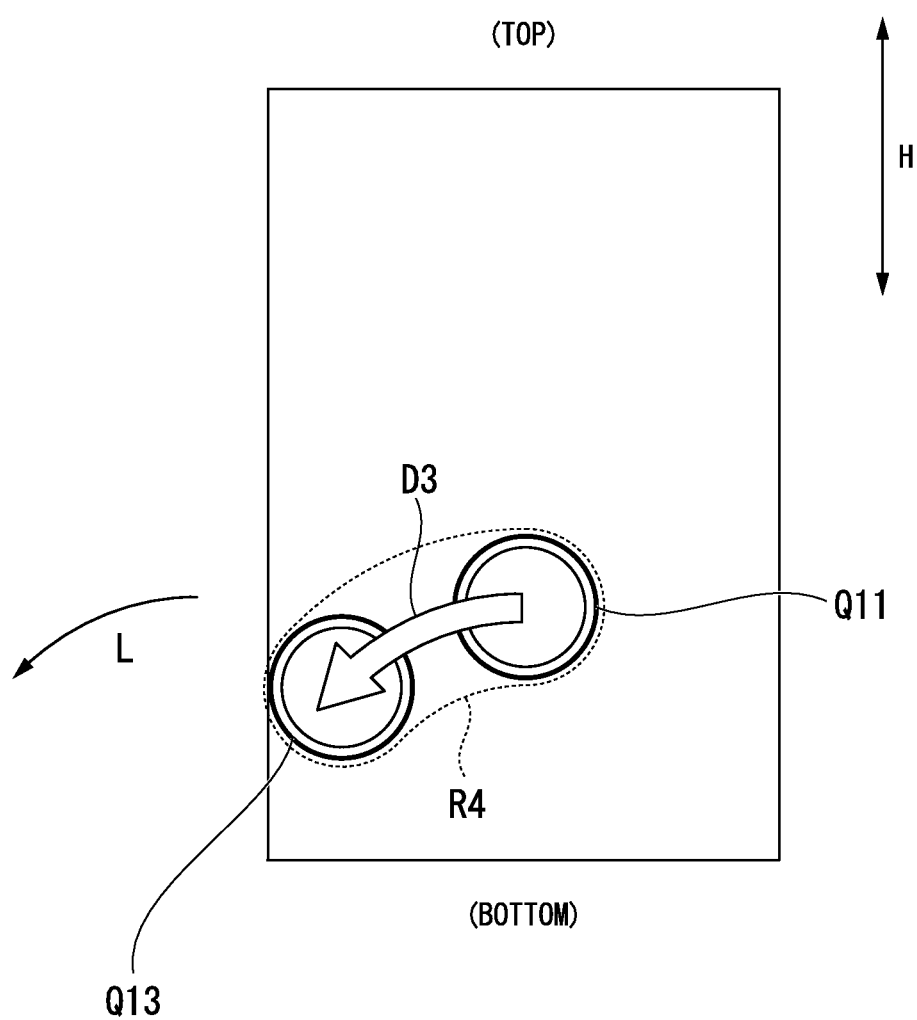
FIG. 6 is a diagram showing still another example of the operation region within the unlocking screen that is displayed on the information processing device (mobile terminal) according to the first exemplary embodiment of the present invention.

Next is described an example of a silent mode setting operation input on the unlocking screen shown in FIG. 3, with reference to FIG. 6.

As shown in FIG. 6, for example, the silent mode setting operation screen region R4 is a region that extends in a direction (third direction L) that is different from the first direction H. In the present exemplary embodiment, the third direction L is a direction that also differs from the second direction R.

In the present exemplary embodiment, the silent mode setting operation screen region R4 is of a shape that corresponds to a predetermined silent mode setting operation path. In the example shown in FIG. 5, the silent mode setting operation screen region R4 is a region that is of an arch-curved shape that extends in the third direction L. In this silent mode setting operation screen region R4, an operation icon Q11 is displayed at one end near the center portion of the unlocking screen, and a silent mode setting operation conclusion icon Q13 is displayed on the other end near the outer periphery portion of the unlocking screen.

That is to say, the silent mode setting operation refers to an operation of moving an operation means in the direction (third direction L), which is different from the directionality D1 of the activation operation (first direction H) and the directionality D2 of the unlocking operation (second direction R), while the operation icon Q11 is maintained being specified by means of a touch operation with the operation means (such as a finger). This operation of moving the operation means in the third direction L may be a flick operation, in which the operation means is flicked in the direction that differs from the first direction H and the second direction R, or it may be a slide operation in which the specified application icon Q11 is moved to the silent mode setting operation conclusion icon Q13.

In this manner, the memory unit 103 of the mobile terminal 1 preliminarily registers that the directionality D1 of the activation operation (first direction H), the directionality D2 of the unlocking operation (second direction R), and the directionality D3 of the silent mode setting operation (third direction L) are operations of different directionalities respectively. Accordingly, the operation content determination unit 121 can separately recognize an activation operation, an unlocking operation, and a silent mode setting operation input on the unlocking screen. Moreover, by providing the activation operation, the unlocking operation, and the silent mode setting operation as operations with directionalities, the operation content determination unit 121 can prevent malfunction due to a false operation.

(An Example of an Operation in the Case where the Security Setting in the Locked State after Releasing of the Locking Function has been Requested is Set to ON)

Figure 7:
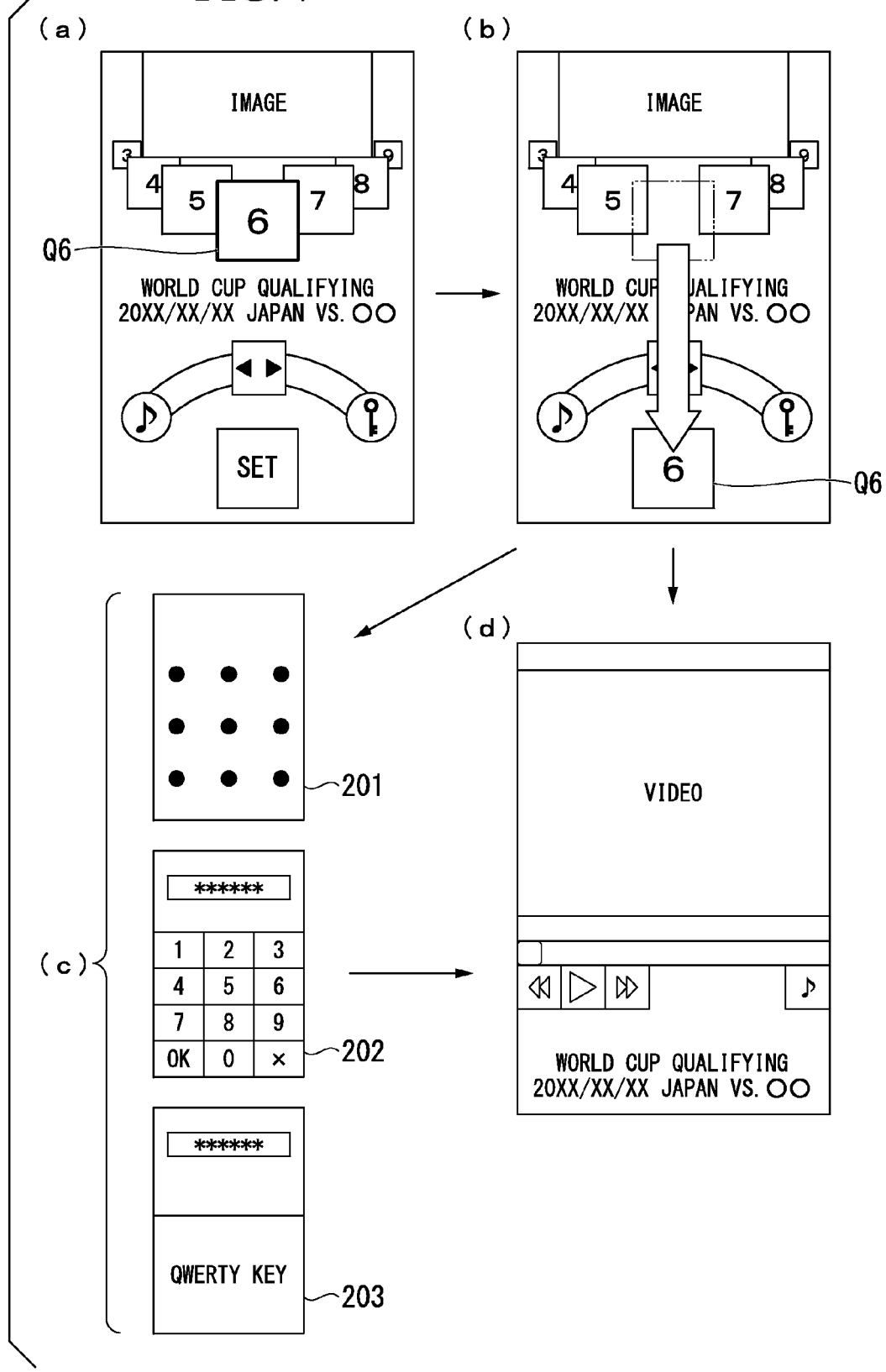
FIG. 7 is a diagram showing an example of transitions of the unlocking screen that are displayed on the information processing device (mobile terminal) according to the first exemplary embodiment of the present invention.

Next is described an example of an application activation operation input on the unlocking screen shown in FIG. 3, with reference to FIG. 7.

The portion (a) of FIG. 7 shows an unlocking screen illustrated in FIG. 3. In the state where the unlocking screen shown in the portion (a) of FIG. 7 is displayed, the application icon Q6 is moved to the activation operation conclusion icon Q10 while the application icon Q6 positioned in the reference start point region R12 is maintained being specified by means of such as a touch operation. Thereby, the operation content determination unit 121 determines an input of activation operation for an application corresponding to the application icon Q6 as having been accepted. At this time, as shown in the portion (b) of FIG. 7, the display control unit 122 displays, in a superimposed manner on the unlocking screen, an image of the application icon Q6 positioned in the reference start point region R12 moving to the activation operation conclusion icon Q10 from the reference start point region R12.

In the case where the setting information memory region 133 stores the flag information that indicates that the security setting in the locked state is set to ON, the display control unit 122 displays a security authentication screen shown in the portion (c) of FIG. 7.

The portion of (c) FIG. 7 shows authentication screens 201, 202, and 203 as examples of the security authentication screen.

This authentication screen 201 is an operation screen that accepts a pattern input for pattern authentication. On this authentication screen 201, nine marks are arranged in a grid pattern. In the case where pattern authentication is already decided as the method of security authentication, the display control unit 122 displays the authentication screen 201 on the display unit 112 if the operation content determination unit 121 determines an input of application activation operation as having been made. Then, the authentication unit 125 determines whether or not the input pattern matches a preliminarily registered pattern, based on the operation input on the authentication screen 201. If these patterns match, then the authentication unit 125 outputs to the display control unit 122 and the information processing unit 123 information that indicates authentication being validated.

In the case where the authentication unit 125 validates authentication in this manner, the display control unit 122 executes an application displaying process, and displays on the display unit 112 an image that corresponds to the specified application icon as shown in the portion (d) of FIG. 7.

The authentication screen 202 is an operation screen that accepts a secret identification code for PIN authentication.

This authentication screen 202 shows a numeric key input screen for inputting a secret identification code, and an input field that indicates an input result.

The authentication screen 203 is an operation screen that accepts a password input for password authentication. This authentication screen 203 shows a QWERTY key input screen for inputting a password, and an input field that indicates an input result.

In the case where PIN authentication is already decided as the method of security authentication, the display control unit 122 displays the authentication screen 202 on the display unit 112 if the operation content determination unit 121 determines an input of application activation operation as having been made. In the case where password authentication is already decided as the method of security authentication, the display control unit 122 displays the authentication screen 203 on the display unit 112 if the operation content determination unit 121 determines an input of application activation operation as having been made.

Similarly, in this case, the authentication unit 125 determines whether or not the input secret identification code or password matches a preliminarily registered secret identification code or password, based on the operation input on the authentication screens 202 or 203. If the secret identification code or password matches, then the authentication unit 125 outputs to the display control unit 122 and the information processing unit 123, information that indicates authentication being validated.

In this manner, in the case where there is stored the flag information indicating that the security setting in the locked state is set to ON, the information processing unit 123 activates the specified application after the authentication unit 125 has executed authentication. Therefore, security can be ensured.

Moreover, in the case where there is stored the flag information indicating that the security setting in the locked state is set to ON, authentication is executed after the user has performed an operation of instructing application activation on the unlocking screen, and therefore, confusion can be prevented for the user.

For example, there is assumed a case of not following the present exemplary embodiment in which an image that indicates whether or not there is an authentication execution is displayed before displaying the unlocking screen. In this case, the authentication screen is displayed (if the authentication function is set to "required") or the unlocking screen is displayed (if the authentication function is set to "not required") immediately after the power is turned ON. That is to say, the screen that is displayed immediately after the power is turned ON changes, depending on whether the authentication function is set to "required" or "not required". Therefore, it is difficult for the user to intuitively assume which screen will be displayed.

On the other hand, according to the present exemplary embodiment, the screen displayed immediately after the power is turned ON is the unlocking screen regardless of whether the authentication function is set to "required" or "not required", and therefore, it is easy for the user to intuitively assume which screen will be displayed. That is to say, it is possible to provide the user with a recognition that the screen that is displayed immediately after the power is turned ON is always the unlocking screen (immediately after power is turned ON=unlocking screen will be displayed). In this manner, according to the present exemplary embodiment, in the case where the authentication function is set to "required", authentication is executed after the user has performed an operation of instructing application activation on the unlocking screen, and therefore, confusion can be prevented for the user.

Figure 8:
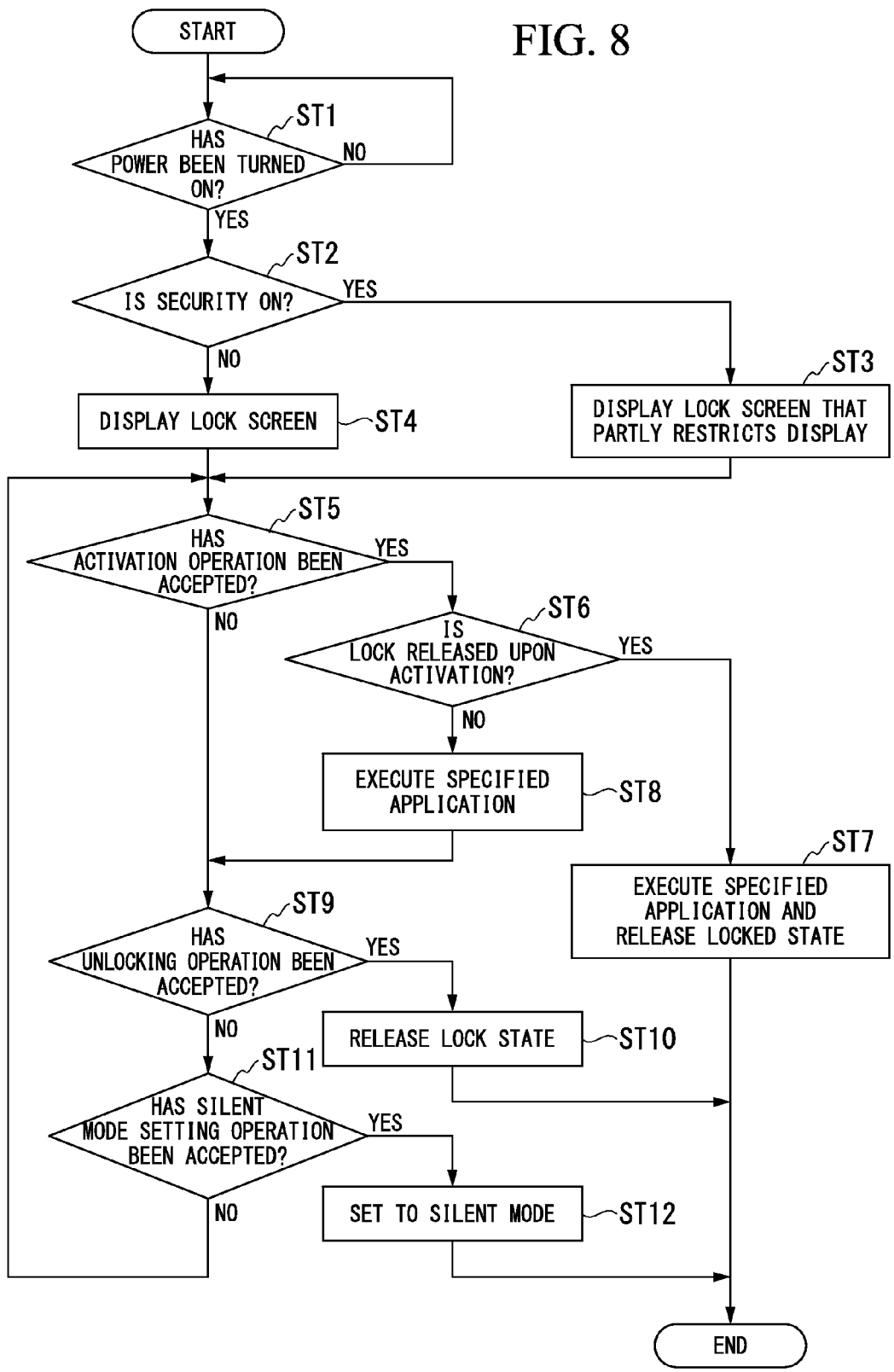
FIG. 8 is a flowchart showing an example of an operation process of the information processing device (mobile terminal) according to the first exemplary embodiment of the present invention.

Next, an operation process flow of the mobile terminal 1 according to the present exemplary embodiment is described, with reference to FIG. 8. FIG. 8 is a flowchart for describing an operation process flow of the mobile terminal 1 according to the present exemplary embodiment.

(Step ST1)

The control unit 102 of the mobile terminal 1 determines whether or not the power is turned ON. For example, in the case where the power button (not shown in the figure) is pressed down while the power is in the OFF state, the operation content determination unit 121 determines an operation of turning the power ON as having been accepted.

(Step ST2)

Next, the display control unit 122 makes reference to the setting information memory region 133 stored in the memory unit 103, and determines whether or not the security setting is set to ON.

(Step ST3)

For example, in the case where the setting information memory region 133 stores the flag information that indicates that the security setting in the locked state is set to ON, the display control unit 122 determines the security setting as being set to ON.

Then, the display control unit 122 displays on the display unit 112, the unlocking screen where display of a predetermined portion thereof is restricted. Specifically, here is described a case where the image of an application icon displayed in the application icon display region R1 of the unlocking screen includes privacy related information such as a thumbnail, and an image that indicates a sender. In this case, the display control unit 122 displays, as the image of this application icon, a default image that does not include these types of privacy related information. Moreover, here is described a case where the motion image or video displayed in the content image display region R5 of the unlocking screen or the text data displayed in the application information display region R6 includes privacy related information such as a personal photo or video, and information indicating content and/or sender of an email. In this case, the display control unit 122 does not allow the display of these types of privacy related information.

Furthermore, the operation content determination unit 121 restricts operation input from being made on a predetermined region in the locked state.

(Step ST4)

In the case where the setting information memory region 133 does not store the flag information that indicates that the security setting in the locked state is set to ON, the display control unit 122 determines the security setting as being set to OFF. In other words, in the case where there is stored the flag information that indicates that the security setting in the locked state is set to OFF, the display control unit 122 determines the security setting as being set to OFF.

Then, the display control unit 122 displays, on the display unit 112, an unlocking screen such as shown in FIG. 3 that includes an image that can be displayed on the unlocking screen. That is to say, there is displayed the unlocking screen where privacy related information is also displayed.

Furthermore, the operation content determination unit 121 restricts operation input from being made on a predetermined region in the locked state.

(Step ST5)

Next, the operation content determination unit 121 determines whether or not an activation operation has been accepted. In the present exemplary embodiment, in the case where an input of an operation (such as a flick operation or a slide operation) in the first direction H from the reference start point region R12 is performed on the operation unit 111, the operation content determination unit 121 determines, at the time of accepting this operation, an activation operation that instructs activation of an application corresponding to an application icon displayed in the reference start point region R12 as having been accepted. In the case where an application icon positioned in the reference start point region R12 is first specified by means of such as a touch operation, the operation content determination unit 121 may determine that an activation operation that instructs activation of an application corresponding to the specified application icon has been accepted, as a result of the operation in the first direction H from the reference start point region R12 having been given to this specified application icon.

The process operation of the control unit 102 at the time of accepting this activation operation is described specifically.

On the unlocking screen, the application icon positioned in the reference start point region R12 among the application icons displayed in the application icon display region R1 is specified by the user by means of a touch operation for example. At this time, if the application icon that the user wishes to specify is not positioned in the reference start point region R12, the user moves the application icons displayed in the application icon display region R1 by means of a slide operation or a flick operation. This operation enables the application icon to be specified to move to the reference start point region R12.

Next is described a case where an input of an operation of moving the operation means (user's finger) in the first direction is performed with the specified application icon, from the reference start point region R12 serving as the starting point. For example, a flick operation is input in which the application icon specified by means of a touch operation is flicked in the first direction H from the reference start point region R12. Alternatively, a slide operation is input in which the application icon specified by means of a touch operation is moved in the first direction H to the activation operation conclusion icon Q10 from the reference start point region R12.

In this case, the operation content determination unit 121 determines an input of an operation to instruct an execution of the application corresponding to the specified application icon as having been made. Then the operation content determination unit 121 outputs a signal that indicates the determination result to the information processing unit 123.

The information processing unit 123 then reads the program of the specified application from the memory unit 103 and executes it. This information processing unit 123 outputs the result of the executed information processing to the display control unit 122.

The display control unit 122 displays an image that indicates the information processing result on the display unit 112, based on the information processing result input accepted from the information processing unit 123.

As a result, the unlocking screen displayed on the display unit 112 shifts to a display screen that displays the information processing result corresponding to the specified application icon.

(Step ST6)

If the activation operation is determined in step ST5 as being accepted, the operation content determination unit 121 determines whether or not the setting information memory region 133 stores the flag information indicating that the locking function is released upon activating an application.

(Step ST7)

In the case where the setting information memory region 133 stores the flag information indicating that the locking function is released upon activating an application, the operation content determination unit 121 activates the specified application and determines an operation of releasing the locking function as having been accepted. Then, the operation content determination unit 121 outputs to the information processing unit 123, a control signal indicating an execution of the application that corresponds to the specified application icon, and releases operation input restriction in the region that has been restricted in the locked state.

(Step ST8)

In the case where the setting information memory region 133 does not store the flag information indicating that the locking function is released upon activating an application, the operation content determination unit 121 determines activation of the specified application. In other words, in the case where there is stored flag information indicating that the locking function is not released upon activating an application, the operation content determination unit 121 determines activation of the specified application. Then, the operation content determination unit 121 outputs to the information processing unit 123, a control signal instructing an execution of the application that corresponds to the specified application icon. That is to say, in this case, the operation content determination unit 121 maintains the locked state.

(Step ST9)

In step ST5, if the activation operation is not determined as having been accepted, the operation content determination unit 121 determines whether or not an unlocking operation has been accepted. In the present exemplary embodiment, in the case where there is performed an input of a slide operation to move the operation icon Q11 to the unlocking operation conclusion icon Q12 while it is maintained being specified by means of such as a touch operation, the operation content determination unit 121 determines an unlocking operation for releasing the locking function as having been accepted.
(Step ST10)

The operation content determination unit 121 releases the restriction of operation input to be made on the region that was restricted in the locked state.
(Step ST11)

If the unlocking operation is not determined as having been accepted, the operation content determination unit 121 determines whether or not a silent mode setting operation has been accepted. In the present exemplary embodiment, in the case where there is performed an input of a slide operation to move the operation icon Q11 to the silent mode setting operation conclusion icon Q13 while it is maintained being specified by means of such as a touch operation, the operation content determination unit 121 determines a silent mode setting operation for setting to the silent mode as having been accepted.
(Step ST12)

The operation content determination unit 121 outputs to the information processing unit 123 a control signal that instructs to set to the silent mode.

In the case where the flag information indicating that the security setting in the locked state is set to ON is determined in step ST2 as being stored in the memory unit 103, if an activation operation, an unlocking operation, or a silent mode setting operation is determined as having been accepted respectively in step ST5, step ST9, or step ST11 (YES), the display control unit 122 displays, for example, the authentication screen 201 on the display unit 112. The description of this with reference to figures is omitted here.

Then, the authentication unit 125 determines whether or not the input pattern matches a preliminarily registered pattern, based on the operation input on the authentication screen 201. If these patterns match, then the authentication unit 125 outputs to the display control unit 122 and the information processing unit 123, information that indicates authentication being validated.

As a result, the information processing unit 123 proceeds to the next process, and the display control unit 122 changes the display screen to an image according to the information processing result of the information processing unit 123.
[Second Exemplary Embodiment]

Figure 9:
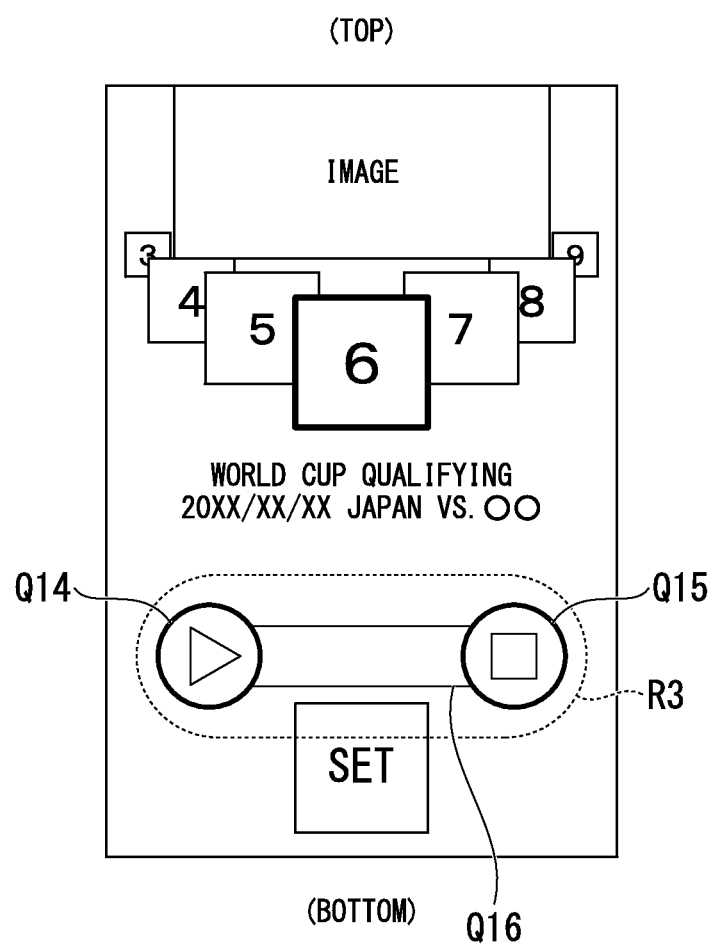
FIG. 9 is a diagram showing an example of an unlocking screen that is displayed on an information processing device (mobile terminal) according to a second exemplary embodiment of the present invention.
Figure 10:
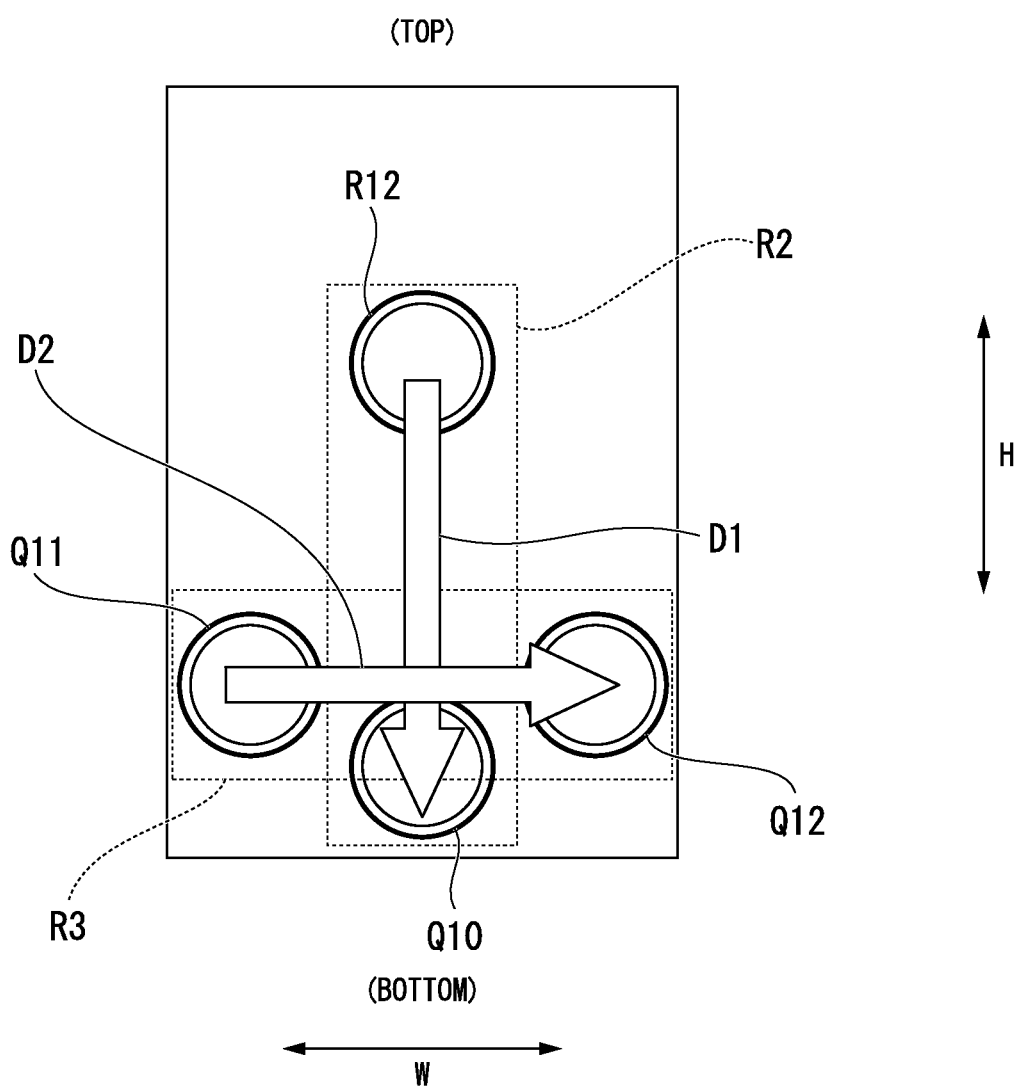
FIG. 10 is a diagram showing an example of an operation region within an unlocking screen that is displayed on an information processing device (mobile terminal) according to a second exemplary embodiment of the present invention.

The mobile terminal 1 according to the exemplary embodiments of the present invention is not limited to the above configuration, and an unlocking screen shown in FIG. 9 and FIG. 10 may be displayed for example.

FIG. 9 is a diagram showing an example of an unlocking screen according to a second exemplary embodiment of the present invention. As shown in FIG. 9, the second exemplary embodiment differs from the first exemplary embodiment in that the image displayed in the unlocking operation screen region R3 is different and that the silent mode setting operation screen region R4 is not set. Other parts of the second exemplary embodiment are similar to those of the first exemplary embodiment, and therefore, detailed descriptions thereof are omitted.

As shown in FIG. 9, an unlocking icon Q14 is displayed on one end of the unlocking operation screen region R3 where an unlocking operation is to be accepted, and an end mark Q15 is displayed on the other end.

Between these unlocking icon Q14 and end mark Q15, there is displayed an operation path display area Q16 for showing the content of linear operation.

In the present exemplary embodiment, the unlocking operation refers to an operation of linearly moving the unlocking icon Q14 along the operation path display area Q16 to the end mark Q15 while the unlocking icon Q14 is maintained being specified by means of such as a touch operation.

FIG. 10 is a diagram showing an example of an operation region that is preliminarily decided on the unlocking screen according to the present exemplary embodiment.

As shown in FIG. 10, on the unlocking screen according to the present exemplary embodiment, the direction of the activation operation directionality D1 (first direction H) and the direction of the unlocking operation directionality D2 (fourth direction W) are orthogonal to each other. That is to say, the first direction H and the fourth direction W intersect with each other. In the present exemplary embodiment, the activation operation screen region R2 and the unlocking operation screen region R3 are positioned so that the path of the activation operation and the path of the unlocking operation are in a positional relationship in which they intersect with each other on the unlocking screen.

In this manner, the memory unit 103 of the mobile terminal 1 preliminarily registers that the directionality D1 of the activation operation (first direction H) and the directionality D2 of the unlocking operation (fourth direction W) are operations of different directionalities from each other. Accordingly, the operation content determination unit 121 can separately recognize an activation operation and an unlocking operation input on the unlocking screen. Moreover, the activation operation and the unlocking operation are provided as operations with directionalities. As a result, the operation content determination unit 121 can more clearly determine whether it is an activation operation or an unlocking operation, by distinguishing them from a false operation mistakenly input on the unlocking screen. In the present exemplary embodiment, as movements of the activation operation and the unlocking operation, movements that are highly unlikely to be operated falsely as mentioned above are registered, and thereby it is possible to prevent malfunction due to a false operation.

Furthermore, in the case of inputting an activation operation or an unlocking operation, the user only needs to perform, on an icon, each of these clearly distinguished operations with similar operation aspects (moving operations each with a different direction), following the conclusion icon or an image that indicates the operation direction displayed on the unlocking screen. As a result, the user can easily perform an operation for activating a function and an unlocking operation without being confused.

The unlocking operation may be any operation as long as it is an operation of moving the operation means in the fourth direction W. For example, the unlocking operation may be a flick operation in which the operation means specifying the specified unlocking icon Q14 is flicked in the direction of the fourth direction W. Moreover, the unlocking operation may be a slide operation to move the specified unlocking icon Q14 to the unlocking operation conclusion icon Q12.
[Third Exemplary Embodiment]

The mobile terminal 1 according to the exemplary embodiments of the present invention is not limited to the above configuration, and it may be of a configuration described below for example.

For example, the display control unit 122 may display information indicating the current date and time in the content image display region R5 or application information display region R6, based on the time information input from the timer 106. The display control unit 122 may display, in the region displaying the activation operation conclusion icon R10, information indicating the current date and time instead of this activation operation conclusion icon Q10.

With this type of configuration, the user can confirm the current date/time information, and can be made aware of the directionality of the first direction H for moving the application icon positioned in the reference start point region R12. Moreover, it is possible to be made aware of the terminal point of the slide operation of this application icon. As a result, the user can visually recognize the content of the activation operation from the unlocking screen, and can intentionally perform the activation operation.

In the case of displaying information indicating the current date and time instead of the activation operation conclusion icon Q10, the display control unit 122 may hide display of the current date and time if an application icon positioned in the reference start point region R12 is specified, or if an operation is performed to move an application icon positioned in the reference start point region R12 toward the position where the current date/time information is displayed.

In this case, the display control unit 122 may display the activation operation conclusion icon Q10 instead of information indicating the current date and time, if an application icon positioned in the reference start point region R12 is specified.

With this type of configuration, the user can easily confirm time information when necessary, and the display region can be conserved. Furthermore, if an operation is given on an activation operation target application icon, by changing the image of the position indicating the activation operation directionality D1 (first direction H), it is possible to display that the region where the image has changed (that is, the region where the hidden time information was displayed) is the destination of the moving operation. As a result, the user can easily recognize the destination of the moving operation that should be performed next on the application icon.

[Fourth Exemplary Embodiment]

The mobile terminal 1 according to the exemplary embodiments of the present invention is not limited to the above configuration, and it may be of a configuration described below for example.

For example, the display control unit 122 may display application icons to be displayed in the application icon display region R1 in a greater region that includes this application icon display region R1. An example of this display is shown in FIG. 11.

Figure 11:
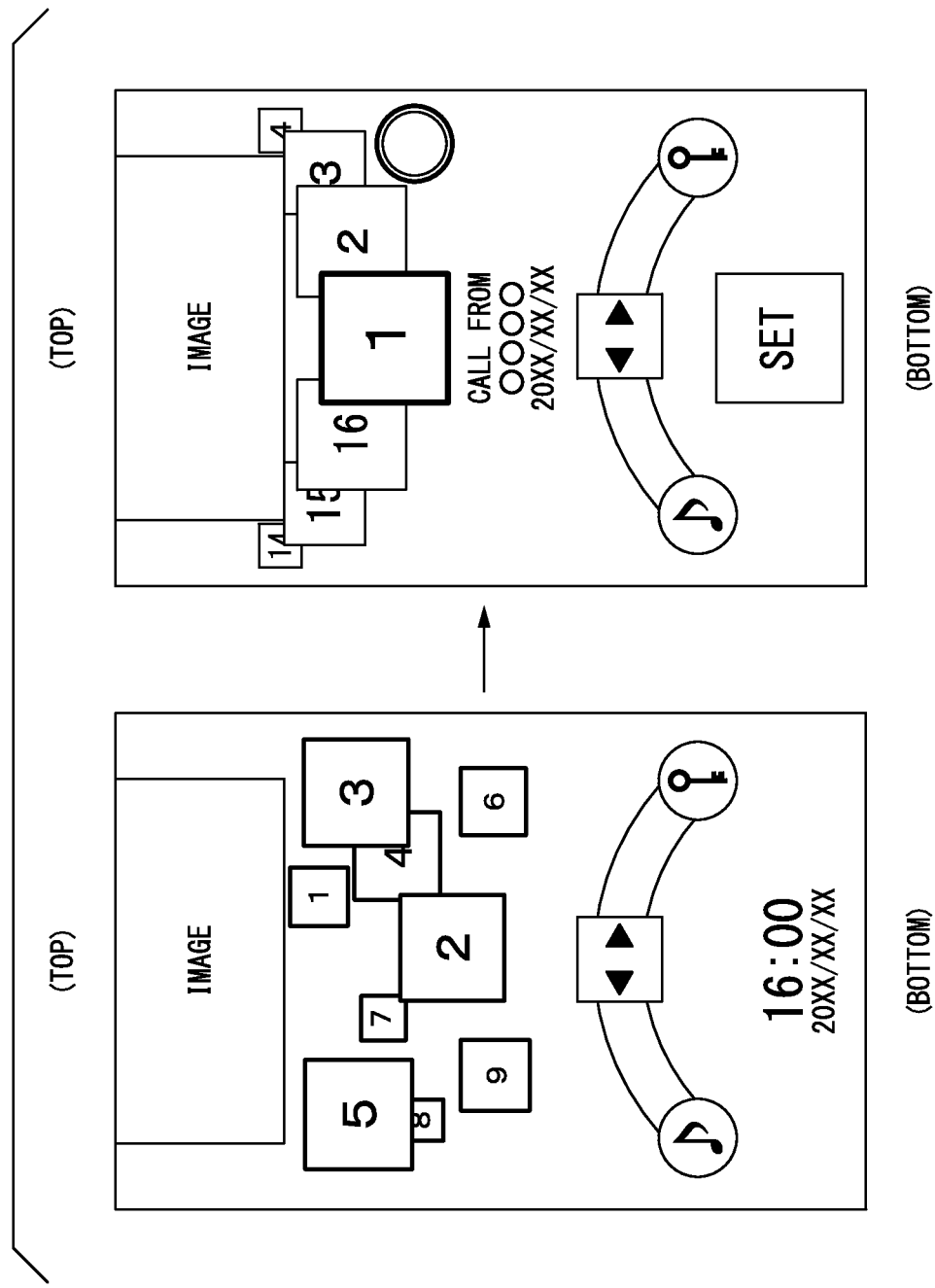
FIG. 11 is a diagram showing an example of an unlocking screen that is displayed on an information processing device (mobile terminal) according to a fourth exemplary embodiment of the present invention.

As shown in FIG. 11, in the case where the power is turned ON and the unlocking screen is displayed, the display control unit 122 displays an animated image in which the application icons displayed in the application icon display region R1 appear to float in the greater region that includes this application icon display region R1. For example, if a touch operation input is performed in the region where the animated image that displays the application icons floating is displayed, the display control unit 122 displays on the display unit 112 an image in which the application icons shown in FIG. 3 are lined up and displayed in the application icon display region R1.

In this manner, by displaying an animated image with application icons that appear to float therein, it is possible to amuse the user visually.

In the present exemplary embodiments, the operation unit 111 and the display unit 112 are described as being a configuration included in the touch panel 101. However, the exemplary embodiments of the present invention are not limited to this. For example, the display unit 112 may be a display unit that is not equipped with a touch sensor, and the operation unit 111 may be an operation means such as a mouse, a keyboard, or a button.

An information processing device according to the present exemplary embodiments has a computer system therein. The operation process is stored in a form of a program on a computer-readable recording medium. The computer system reads and executes this program, and thereby the above process is performed. The term "computer system" here includes a CPU, various types of memories, an operating system, and hardware such as peripheral devices.

The "computer system" also includes a homepage provision environment (or display environment) in those cases where a WWW system is used.

A program for realizing the respective steps may be recorded on a computer-readable recording medium. Moreover, a program for realizing this function may be recorded on a computer-readable recording medium. Then, the programs recorded on these recording media may be read and executed on a computer system to thereby perform a process of calculating an estimated value of shape information of a detection target.

The term "computer-readable recording medium" refers to a portable medium such as a flexible disk, a magneto-optical disk, a ROM, a writable nonvolatile memory such as a flash memory, and a CD-ROM, as well as a memory storage device such as a built-in hard disk drive of a computer system.

The "computer-readable recording medium" includes one that retains a program for a certain period of time such as a volatile memory (for example, DRAM (dynamic random access memory) inside a computer system serving as a server and/or client in the case where the program is transmitted through a network such as the Internet or through a communication line such as telephone line.

The above program may be transmitted to another computer system via a transmission medium or transmission wave in the transmission medium, from a computer system having this program stored on a memory storage device. The "transmission medium" that transmits the program refers to a medium that has a function to transmit information such as a network (communication network) including the Internet, and a communication line including a telephone line.

The above program may realize part of the functions described above.

It may be a so-called difference file (difference program), which can realize the above functions in combination with a program that is preliminarily recorded on a computer system.

Figure 12:
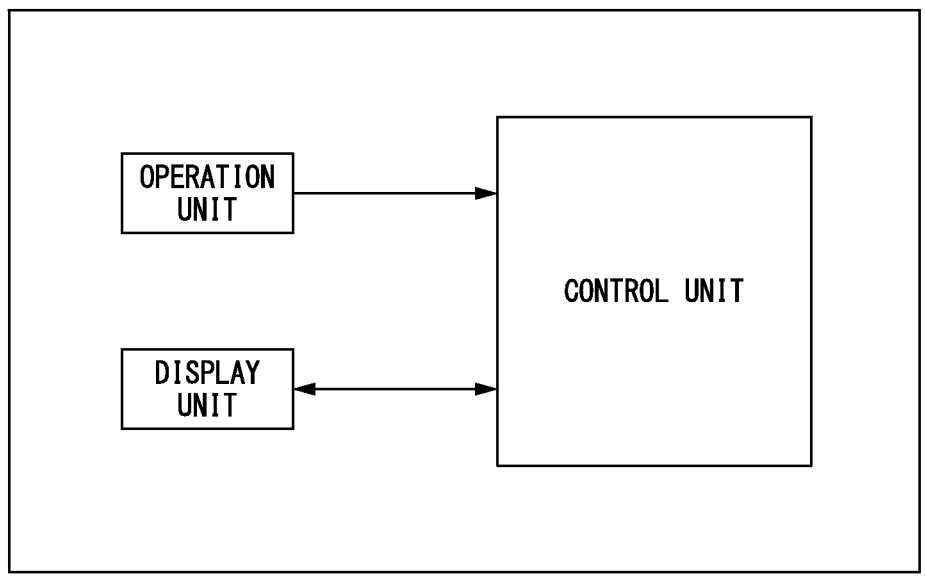
FIG. 12 is a diagram showing an example of a minimum configuration of an information processing device according to an exemplary embodiment of the present invention.

The minimum constituents of an information processing device according to an exemplary embodiment of the present invention are: a display unit that displays a display screen; an operation unit that accepts a specified operation made on the display screen of the display unit; and a control unit that causes the display unit to display an unlocking screen including an indicator corresponding to a predetermined information processing function, and controls the operation unit into a state of accepting a specified operation on the indicator, based on a request for releasing a locking function of prohibiting a predetermined specified operation from being made on the operation unit, in a state where the locking function is active. This configuration is shown in FIG. 12.

The above exemplary embodiments may be partly or entirely described as the following supplementary notes, however they are not limited thereto.

(Supplementary Note 1)

An information processing device including: a display unit that displays a display screen; an operation unit that accepts a specified operation made on the display screen of the display unit; and a control unit that causes the display unit to display an unlocking screen including an indicator corresponding to a predetermined information processing function, and controls the operation unit into a state of accepting a specified operation on the indicator, based on a request for releasing a locking function of prohibiting a predetermined specified operation from being made on the operation unit, in a state where the locking function is active, the control unit determining that an unlocking operation for releasing the locking function has been input, in a case of accepting a specified operation indicating release of the locking function on the unlocking screen via the operation unit, the control unit determining that an activation operation of the information processing function corresponding to the indicator has been input, in a case of accepting an instruction operation indicating an execution of the information processing on the indicator via the operation unit.

(Supplementary Note 2)

The information processing device according to supplementary note 1, wherein: the unlocking screen includes a first operation screen region, and a second operation screen region that at least partly differs from the first operation screen region; the control unit determines that the activation operation has been input in a case of detecting an operation made in the first operation screen region; and the control unit determines that the unlocking operation has been input in a case of detecting an operation made in the second operation screen region.

(Supplementary Note 3)

The information processing device according to supplementary note 1 or 2, wherein: the control unit determines that the activation operation has been input in a case where the operation unit detects, on the unlocking screen, a movement of an operation body in a first direction; and the control unit determines that the unlocking operation has been input in a case where the operation unit detects, on the unlocking screen, a movement of the operation body in a second direction different from the first direction.

(Supplementary Note 4)

The information processing device according to any one of supplementary note 1 to 3, wherein the control unit executes the information processing function corresponding to the indicator and releases the locking function, in a case where the activation operation on the indicator is input.

(Supplementary Note 5)

The information processing device according to any one of supplementary note 1 to 4, wherein the control unit determines that the activation operation has been input in a case where the indicator is specified in a state where the indicator is positioned in a predetermined reference start point region on the unlocking screen, and the operation unit detects a movement of an operation body being made on the specified indicator in a predetermined direction.

(Supplementary Note 6)

The information processing device according to any one of supplementary note 1 to 5, wherein the control unit determines that the activation operation has been input in a case where the operation unit detects, on the unlocking screen, a movement of the indicator being moved linearly from a predetermined starting point to a predetermined terminal point.

(Supplementary Note 7)

The information processing device according to any one of supplementary note 1 to 6, wherein a path of an operation determined as an activation operation by the control unit, and a path of an operation determined as an unlocking operation by the control unit, are in a positional relationship in which they intersect with each other.

(Supplementary Note 8)

The information processing device according to any one of supplementary note 1 to 7, wherein the unlocking screen of the display unit displays related information that relates to the information processing function corresponding to the indicator.

(Supplementary Note 9)

The information processing device according to any one of supplementary note 1 to 7, wherein in a case where the activation operation is input on the indicator, the control unit makes reference to authentication information verifying that a user is approved for an execution of the information processing function corresponding to the indicator, and authenticates that an operation input made on the unlocking screen is an operation performed by the user.

(Supplementary Note 10)

The information processing device according to supplementary note 9, wherein the control unit restricts part of information to be displayed on the unlocking screen when an execution of the authentication is preliminarily decided in a case where the activation operation is input on the indicator.

(Supplementary Note 11)

The information processing device according to supplementary note 9 or 10, wherein the control unit changes a display mode of the indicator to a display mode that restricts information related to a content of the information processing function corresponding to the indicator when an execution of the authentication is preliminarily decided in a case where the activation operation is input on the indicator.

(Supplementary Note 12)

The information processing device according to any one of supplementary note 1 to 11, wherein in a case where a movement of an operation body in a predetermined direction is input as the activation operation on the indicator that is displayed on the unlocking screen, the control unit performs a display showing the predetermined direction in the predetermined direction seen from the indicator.

(Supplementary Note 13)

The information processing device according to supplementary note 12, wherein the control unit hides a display showing the predetermined direction in a case of detecting a movement of an operation body in a predetermined direction being made on the indicator.

(Supplementary Note 14)

The information processing device according to supplementary note 13, wherein the control unit is information indicating current time in the predetermined direction when seen from the indicator, as a display showing the predetermined direction.

(Supplementary Note 15)

The information processing device according to any one of supplementary note 1 to 14, wherein the control unit displays on the unlocking screen an image or motion image of content stored in a memory unit.

(Supplementary Note 16)

The information processing device according to any one of supplementary note 1 to 15, wherein the control unit displays on the unlocking screen an animated image to display a plurality of the indicators that appear floating.

(Supplementary Note 17)

An information processing method includes: causing a display unit to display an unlocking screen including an indicator corresponding to a predetermined information processing function, based on a request for releasing a locking function of prohibiting a predetermined specified operation from being made on an operation unit accepts a specified operation made on a display screen of the display unit, in a state where the locking function is active; determining that an unlocking operation for releasing the locking function has been input, in a case of accepting a specified operation indicating release of the locking function on the unlocking screen via the operation unit; and determining that an activation operation of the information processing function corresponding to the indicator has been input, in a case of accepting an instruction operation indicating an execution of the information processing on the indicator via the operation unit.

(Supplementary Note 18)

An information processing program that causes a computer to function as: a display unit that displays a display screen; an operation unit that accepts a specified operation made on the display screen of the display unit; and a control unit that causes the display unit to display an unlocking screen including an indicator corresponding to a predetermined information processing function, and controls the operation unit into a state of accepting a specified operation on the indicator, based on a request for releasing a locking function of prohibiting a predetermined specified operation from being made on the operation unit, in a state where the locking function is active, the control unit determining that an unlocking operation for releasing the locking function has been input, in a case of accepting a specified operation indicating release of the locking function on the unlocking screen via the operation unit, the control unit determining that an activation operation of the information processing function corresponding to the indicator has been input, in a case of accepting an instruction operation indicating an execution of the information processing on the indicator via the operation means.

While the invention has been particularly shown and described with reference to exemplary embodiments thereof, the invention is not limited to these embodiments. It will be understood by those of ordinary skill in the art that various changes in form and details may be made therein without departing from the scope of the present invention as defined by the claims.

This application is based upon and claims the benefit of priority from Japanese patent application No. 2012-049321, filed Mar. 6, 2012, the disclosure of which is incorporated herein in its entirety by reference.

INDUSTRIAL APPLICABILITY

The present invention may be applied to an information processing device, an information processing method, and an information processing program. According to the information processing device, the information processing method, and the information processing of the present invention, an activation of a predetermined information processing function can be instructed in the locked state.

REFERENCE SYMBOLS

1 Mobile terminal
2 Wireless communication network
2A Base station
2B Exchange
3 Another mobile terminal
4 Internet
5 Server
101 Touch panel
102 Control unit
103 Memory unit
104 Audio signal processing unit
105 Wireless communication unit
106 Timer
111 Operation unit
112 Display unit
121 Operation content determination unit
122 Display control unit
123 Information processing unit
124 Registration unit
125 Authentication unit
131 Program memory region
132 Temporary memory region
133 Setting information memory region

The invention claimed is:

1. An information processing device comprising:
a display that displays a display screen;
an operation unit comprising a sensor that accepts a specified operation made on the display screen; and
a control unit comprising a memory having stored executable instructions and one or more processors configured to executed the store instructions to:
cause the display to display an unlocking screen including a first indicator and a second indicator corresponding to a specified information processing function, the first indicator being displayed at a first position, and the second indicator being displayed at a second position different from the first position;
control the operation unit into a state of accepting an operation on the second indicator when a locking function is active, wherein the locking function prohibits a predetermined specified operation from being made on the operation unit;
determine that an unlocking operation for releasing the locking function has been input when the control unit accepts a specified operation indicating release of the locking function on the first indicator via the operation unit; and
determine that an activation operation of the specified information processing function corresponding to the second indicator has been input when the control unit accepts an instruction operation indicating an execution of the specified information processing function on the second indicator via the operation unit, the instruction operation including a movement of an operation body in a first direction from the second position toward the first position.

2. The information processing device according to claim 1, wherein:
the unlocking screen includes a first operation screen region, and a second operation screen region that at least partly differs from the first operation screen region, the first operation screen region including the first position and the second position, the second operation screen region including the first indicator;
the one or more processors of the control unit are configured to determine that the activation operation has been input when detecting an operation made on the second indicator displayed at the second position of the first operation screen region; and
the one or more processors of the control unit are configured to determine that the unlocking operation has been input when detecting an operation made on the first indicator displayed at the first position of the second operation screen region.

3. The information processing device according to claim 1, wherein:
the one or more processors of the control unit are configured to determine that the unlocking operation has been input when the operation unit detects, on the unlocking screen, a movement of the operation body in a second direction different from the first direction.

4. The information processing device according to claim 1, wherein the one or more processors of the control unit are configured to execute the predetermined information processing function corresponding to the second indicator and to release the locking function when the activation operation on the second indicator is input.

5. The information processing device according to claim 1, wherein the movement is a movement of the operation body starting from the second position and linearly approaching the first position.

6. The information processing device according to claim 1, wherein a first path of an operation determined as an activation operation by the control unit, and a second path of an operation determined as an unlocking operation by the one or more processors of the control unit, are in a positional relationship in which the first and second paths intersect with each other.

7. The information processing device according to claim 1, wherein the unlocking screen of the display displays related information that relates to the specified information processing function corresponding to the second indicator.

8. The information processing device according to claim 1, wherein when the activation operation is input on the second indicator, the one or more processors of the control unit are configured to reference authentication information verifying that a user is approved for an execution of the specified information processing function corresponding to the second indicator, and to authenticate that an operation input made on the unlocking screen is an operation performed by the user.

9. The information processing device according to claim 8, wherein the one or more processors of the control unit are configured to restrict part of information to be displayed on the unlocking screen when an execution of the authentication is preliminarily decided when the activation operation is input on the second indicator.

10. The information processing device according to claim 8, wherein the one or more processors of the control unit are configured to change a display mode of the second indicator to a display mode that restricts information related to a content of the specified information processing function corresponding to the second indicator when an execution of the authentication is preliminarily decided when the activation operation is input on the second indicator.

11. The information processing device according to claim 1, wherein the one or more processors of the control unit are configured to control the display to display first direction at a position away from the second indicator in the first direction.

12. The information processing device according to claim 11, wherein the one or more processors of the control unit are configured to control the display to hide the first direction when detecting the movement.

13. The information processing device according to claim 12, wherein the one or more processors of the control unit are configured to control the one or more processors of the display to display information indicating current time at a position away from the second indicator in the predetermined direction, as the display showing the first direction.

14. The information processing device according to claim 1, wherein the one or more processors of the control unit are configured to control the one or more processors of the display to display on the unlocking screen an image or motion image of content stored in memory.

15. The information processing device according to claim 1, wherein the second indicator includes a plurality of second indicators, and the one or more processors of the control unit are configured to display on the unlocking screen an animation of the second indicators floating.

16. The information processing device according to claim 1, wherein the instruction operation further includes a movement of the operation body passing through the second position.

17. An information processing method comprising:
causing, by a processor, a display to display an unlocking screen including a first indicator and a second indicator corresponding to an information processing function, the first indicator being displayed at a first position, the second indicator being displayed at a second position different from the first position;
determining, by the processor, that an unlocking operation for releasing a locking function configured to prohibit a specified operation from being made has been accepted via a specified operation indicating release of the locking function on the first indicator and
determining, by the processor, that an activation operation of the specified information processing function corresponding to the second indicator has been input when the processor accepts an instruction operation indicating an execution of the specified information processing function on the second indicator, the instruction operation including a movement of an operation body in a first direction from the second position toward the first position.

18. The information processing method according to claim 17, wherein the instruction operation further includes a movement of the operation body passing through the second position.

19. A tangible, non-transitory computer-readable medium storing executable instructions that, when executed by a processor, cause the processor to:
display a display screen;
accept an operation made on the display screen;
cause display on the display screen of an unlocking screen including a first indicator and a second indicator corresponding to a specified information processing function, the first indicator being displayed at a first position, and the second indicator being displayed at a second position different from the first position;
accept an operation on the second indicator when a locking function is active, wherein the locking function prohibits a predetermined specified operation from being made;
determine that an unlocking operation for releasing the locking function has been input when a specified operation indicating release of the locking function on the first indicator has been accepted;
determine that an activation operation of the specified information processing function corresponding to the second indicator has been input when an instruction operation indicating an execution of the specified information processing function on the second indicator has been accepted, the instruction operation including a movement of an operation body in a first direction from the second position and toward the first position.

20. The non-transitory computer-readable recording medium according to claim 19, wherein the instruction operation further includes a movement of the operation body passing through the second position.

* * * * *

UNITED STATES PATENT AND TRADEMARK OFFICE
CERTIFICATE OF CORRECTION

PATENT NO. : 9,326,147 B2  
APPLICATION NO. : 14/382643  
DATED : April 26, 2016  
INVENTOR(S) : Yuko Nakazawa It is certified that error appears in the above-identified patent and that said Letters Patent is hereby corrected as shown below:

In the Claims

Claim 1, Col. 30, Line 23, "store" should read as --stored--.

Signed and Sealed this  
Twenty-eighth Day of June, 2016

Michelle K. Lee  
*Director of the United States Patent and Trademark Office*